US012812261B2

(12) United States Patent
Vandame et al.

(10) Patent No.: US 12,812,261 B2
(45) Date of Patent: Nov. 24, 2026

(54) NONA-PIXEL COLOR FILTER ARRAY

(71) Applicants: InterDigital CE Patent Holdings, SAS, Paris (FR); Commissariat à l'Energie Atomique et aux Energies Alternatives, Paris (FR)

(72) Inventors: Benoit Vandame, Betton (FR); Guillaume Chataignier, Cesson-Sevigne (FR); Jérôme Vaillant, Grenoble (FR)

(73) Assignees: InterDigital CE Patent Holdings, SAS, Paris (FR); Commissariat à l'Energie Atomique et aux Energies Alternatives, Paris (FR)

( * ) Notice: Subject to any disclaimer, the term of this patent is extended or adjusted under 35 U.S.C. 154(b) by 264 days.

(21) Appl. No.: 18/575,755

(22) PCT Filed: Jun. 28, 2022

(86) PCT No.: PCT/EP2022/067700

§ 371 (c)(1),
(2) Date: Dec. 29, 2023

(87) PCT Pub. No.: WO2023/275032

PCT Pub. Date: Jan. 5, 2023

(65) Prior Publication Data

US 2024/0323551 A1 Sep. 26, 2024

(30) Foreign Application Priority Data

Jul. 2, 2021 (EP) .................................... 21305922

(51) Int. Cl.
*H04N 25/13* (2023.01)
*G06T 3/4015* (2024.01)
(Continued)

(52) U.S. Cl.
CPC ......... *H04N 25/134* (2023.01); *G06T 3/4015* (2013.01); *H04N 23/55* (2023.01); *H04N 23/957* (2023.01)

(58) Field of Classification Search
CPC .... H04N 25/134; H04N 23/55; H04N 23/957; G06T 3/4015
(Continued)

(56) References Cited

U.S. PATENT DOCUMENTS 3,971,065 A 7/1976 Bayer
6,940,061 B2 9/2005 Baharav
(Continued)

FOREIGN PATENT DOCUMENTS

CN 105993169 A 10/2016
EP 2683166 A1 1/2014
(Continued)

OTHER PUBLICATIONS

International Search Report and Written Opinion for PCT/EP2022/067700 mailed Nov. 9, 2022 (14 pages).
(Continued)

*Primary Examiner* — Pritham D Prabhakher
(74) *Attorney, Agent, or Firm* — Klintworth & Rozenblat LLP

(57) ABSTRACT

Example embodiments provide a color filter pattern for a plenoptic sensor. In some embodiments, the plenoptic sensor is a nona-pixel sensor comprising a plurality of microlenses and a respective 3×3 array of color filter pixels under each microlens. The filter pixels have three different colors, and the colors of the color filter pixels are arranged such that each of the sub-aperture images generated from the plenoptic image has an extended Bayer pattern, and such that the pixels of a refocused image generated by adding the sub-aperture images with a disparity value of zero or one receive
(Continued)

| | | | | | |
|---|---|---|---|---|---|
| G | G | R | B | B | G |
| B | R | R | G | G | B |
| G | B | B | R | R | R |
| B | B | G | R | R | B |
| R | G | G | B | B | R |
| B | R | R | G | G | G |

contributions from three pixels of the first color, three pixels of the second color, and three pixels of the third color.

20 Claims, 21 Drawing Sheets

(51) Int. Cl.
*H04N 23/55* (2023.01)
*H04N 23/957* (2023.01)

(58) Field of Classification Search
USPC .......................................................... 348/222.1
See application file for complete search history.

(56) References Cited

U.S. PATENT DOCUMENTS

| | | | | |
|---|---|---|---|---|
| 7,015,961 | B2 | 3/2006 | Kakarala | |
| 7,092,166 | B1 | 8/2006 | Wood | |
| 7,440,016 | B2 | 10/2008 | Keshet | |
| 7,456,881 | B2 | 11/2008 | Hu | |
| 7,469,059 | B1 | 12/2008 | Lefevere | |
| 7,471,842 | B2 | 12/2008 | Wu | |
| 7,502,505 | B2 | 3/2009 | Malvar | |
| 7,646,910 | B1 | 1/2010 | Linzer | |
| 7,965,888 | B2 | 6/2011 | Linzer | |
| 8,054,352 | B2 | 11/2011 | Kim | |
| 8,131,071 | B2 | 3/2012 | Linzer | |
| 8,345,144 | B1 | 1/2013 | Georgiev | |
| 8,456,552 | B2 | 6/2013 | Tajiri | |
| 8,471,920 | B2 | 6/2013 | Georgiev | |
| 8,804,015 | B2 | 8/2014 | Hayashi | |
| 8,890,954 | B2 | 11/2014 | O'Donnell | |
| 8,896,694 | B2 | 11/2014 | O'Donnell | |
| 9,117,718 | B2 | 8/2015 | Ohshitanai | |
| 9,210,391 | B1 | 12/2015 | Mills | |
| 9,219,870 | B1 | 12/2015 | Mills | |
| 9,240,049 | B2 | 1/2016 | Ciurea | |
| 9,300,932 | B2 | 3/2016 | Knight | |
| 9,711,553 | B2 | 7/2017 | Kim | |
| 9,742,975 | B2 | 8/2017 | O'Donnell | |
| 9,756,266 | B2 | 9/2017 | Mills | |
| 9,807,368 | B2 | 10/2017 | Vandame | |
| 10,110,869 | B2 | 10/2018 | Kumar | |
| 11,025,869 | B2 * | 6/2021 | Kwag | H04N 23/843 |
| 11,436,700 | B2 * | 9/2022 | Sabater | G06T 3/08 |
| 11,627,250 | B2 * | 4/2023 | Lee | G06V 10/56 348/231.99 |
| 12,087,019 | B2 * | 9/2024 | Lee | G06T 9/00 |
| 2003/0002871 | A1 | 1/2003 | Ohmura | |
| 2009/0027527 | A1 | 1/2009 | Pang | |
| 2009/0128658 | A1 | 5/2009 | Hayasaka | |
| 2010/0238330 | A1 | 9/2010 | Hirota | |
| 2010/0265385 | A1 | 10/2010 | Knight | |
| 2011/0069189 | A1 | 3/2011 | Venkataraman | |
| 2012/0033120 | A1 | 2/2012 | Nakamura | |
| 2012/0194696 | A1 | 8/2012 | Ohshitanai | |
| 2012/0281072 | A1 | 11/2012 | Georgiev | |
| 2012/0326011 | A1 | 12/2012 | Ichimura | |
| 2013/0076968 | A1 | 3/2013 | Ueda | |
| 2013/0107085 | A1 | 5/2013 | Ng | |
| 2013/0127002 | A1 | 5/2013 | Okigawa | |
| 2013/0222553 | A1 | 8/2013 | Tsuchita | |
| 2013/0293750 | A1 | 11/2013 | Tanaka | |
| 2013/0335598 | A1 | 12/2013 | Gustavsson | |
| 2014/0146201 | A1 | 5/2014 | Knight | |
| 2014/0204183 | A1 | 7/2014 | Lee | |
| 2015/0062391 | A1 | 3/2015 | Murata | |
| 2015/0092071 | A1 | 4/2015 | Meng | |
| 2015/0109498 | A1 | 4/2015 | Aoki | |
| 2015/0146049 | A1 | 5/2015 | Tsuchita | |
| 2015/0172614 | A1 | 6/2015 | Tsuchita | |
| 2015/0215593 | A1 | 7/2015 | Sambongi | |
| 2016/0269667 | A1 | 9/2016 | Ono | |
| 2017/0048513 | A1 | 2/2017 | Vandame | |
| 2017/0090149 | A1 | 3/2017 | Galor Gluskin | |
| 2017/0094210 | A1 | 3/2017 | Galor Gluskin | |
| 2017/0178292 | A1 | 6/2017 | Jiang | |
| 2020/0396388 | A1 * | 12/2020 | Kim | H04N 23/55 |
| 2021/0044783 | A1 * | 2/2021 | Kwag | H04N 25/133 |
| 2021/0118092 | A1 * | 4/2021 | Sabater | G06T 3/08 |
| 2021/0344834 | A1 * | 11/2021 | Lee | G06V 10/56 |
| 2021/0385389 | A1 * | 12/2021 | Lee | H04N 23/741 |
| 2021/0385395 | A1 * | 12/2021 | Cha | H04N 23/10 |
| 2022/0020180 | A1 * | 1/2022 | Lee | G06T 9/00 |

FOREIGN PATENT DOCUMENTS

| | | | |
|---|---|---|---|
| EP | 2685726 | A1 | 1/2014 |
| EP | 3131292 | | 2/2017 |
| EP | 3131292 | A1 | 2/2017 |
| EP | 3177011 | A1 | 6/2017 |
| EP | 3462724 | A1 | 4/2019 |
| EP | 3522106 | A1 | 8/2019 |
| GB | 2488905 | | 9/2012 |
| GB | 2505954 | A | 3/2014 |
| GB | 2505954 | B | 5/2017 |
| JP | 2007173035 | A | 7/2007 |
| WO | 2012008209 | A1 | 1/2012 |
| WO | 2012117691 | A1 | 9/2012 |
| WO | 2012124184 | A1 | 9/2012 |
| WO | 2013183379 | A1 | 12/2013 |
| WO | 2014030390 | A1 | 2/2014 |
| WO | 2014164909 | A1 | 10/2014 |
| WO | 2015093332 | A1 | 6/2015 |
| WO | 2019109182 | A1 | 6/2019 |

OTHER PUBLICATIONS

Oh, Y., et al. "A 0.8 μm nonacell for 108 megapixels CMOS image sensor with FD-shared dual conversion gain and 18,000 e-full-well capacitance." In 2020 IEEE International Electron Devices Meeting (IEDM), IEEE, 2020 (4 pages).

Yu, Z. et al., "An analysis of color demosaicing in plenoptic cameras." In 2012 IEEE Conference on Computer Vision and Pattern Recognition, pp. 901-908. IEEE, 2012 (8 pages).

Sabater, Neu, et al., "Accurate Disparity Estimation for Plenoptic Images". Computer Vision—ECCV 2014 Workshops, Springer Publishing (2015), pp. 548-560 (13 pages).

Li, Y. et al., "Scalable coding of plenoptic images by using a sparse set and disparities." IEEE Transactions on Image Processing vol. 25, No. 1, Jan. 2016, pp. 80-91 (12 pages).

Xu, S. et al.,"Multi-view image restoration from plenoptic raw images." ACCV 2014 Workshops , Part II, LNCS 9009, 2015, pp. 3-15 (13 pages).

International Preliminary Report on Patentability for PCT/EP2022/067700 issued Dec. 14, 2023 (7 pages).

Okawa, T. et al., "A ½inch 48M all PDAF CMOS image sensor using 0.8 μm Quad Bayer coding 2x 2OCL with 1.0 lux minimum AF illuminance level." IEEE International Electron Devices Meeting (IEDM), IEEE, 2019 (4 pages).

Hirakawa K. et al "Spatio-Spectral Color Filter Array Design for Optimal Image Recovery" IEEE transactions on image processing vol. 17 No. 10, Oct. 2008 pp. 1876-1890 (15 pages).

International Search Report and Written Opinion of the International Searching Authority for PCT/EP2019/052381 mailed Apr. 25, 2019 (10 pages).

International Preliminary Report on Patentability for PCT/EP2019/052381 mailed Aug. 4, 2020 (6 pages).

Niu, N. et al., "Method of image all-focus based on the microlens array", Science Technology and Engineering, vol. 16, No. 25, Sep. 2016, (5 pages).

Canon Rumors. (Jun. 3, 2015). Patent: ND Filter to Increase Dynamic Range. https://www.canonrumors.com/patent-nd-filter-to-increase-dynamic-range/ last accessed Jun. 20, 2024 (2 pages).

Ng, R. et al., "Digital correction of lens aberrations in light field photography." In International Optical Design Conference, p. WB2. Optica Publishing Group, 2006 (14 pages).

(56) References Cited

OTHER PUBLICATIONS

Georgiev, T. et al., "Superresolution with the focused plenoptic camera." Proceedings of the SPIE—The International Society for Optical Engineering vol. 7873, 2011 (13 pages).
Yu, Z. et al., "An analysis of color demosaicing in plenoptic cameras." In 2012 IEEE Conference on Computer Vision and Pattern Recognition (CVPR), IEEE, 2012 (9 pages).
Merklinger, H. et al., "A technical view of bokeh." Photo Techniques May/Jun. 1997 (5 pages).
Nasse, H. H. "Depth of field and bokeh." Carl Zeiss Camera Lens Division, Mar. 2010 (45 pages).
Bishop, T. E. et al., "The Light Field Camera: Extended Depth of Field, Aliasing, and Superresolution" In IEEE Transactions on Pattern Analysis and Machine Intelligence, vol. 34, No. 5, May 2012 (15 pages).
Wikipedia "Bilinear interpolation" https://en.wikipedia.org/wiki/Bilinear_interpolation last accessed Aug. 12, 2015 (3 pages).
Vandame V. et al., "Plenoptic Refocusing With Aberration Corrections", Invention Submission, May 13, 2015 (15 pages).
Vieira, A., et al., , "Data formats for high efficiency coding of Lytro-Illum light fields," 2015 International Conference on Image Processing Theory, Tools and Applications (IPTA), Orleans, France, 2015, pp. 494-497 (4 pages).

* cited by examiner

| | | | | |
|---|---|---|---|---|
| 9R | 9G | 9R | 9G | 9R |
| 9G | 9B | 9G | 9B | 9G |
| 9R | 9G | 9R | 9G | 9R |

FIG. 12A

| | | | | |
|---|---|---|---|---|
| 4R<br>4G<br>1B | 2R<br>5G<br>2B | 4R<br>4G<br>1B | 2R<br>5G<br>2B | 4R<br>4G<br>1B |
| 2R<br>5G<br>2B | 1R<br>4G<br>4B | 2R<br>5G<br>2B | 1R<br>4G<br>4B | 2R<br>5G<br>2B |
| 4R<br>4G<br>1B | 2R<br>5G<br>2B | 4R<br>4G<br>1B | 2R<br>5G<br>2B | 4R<br>4G<br>1B |

FIG. 12B

| | | | | | |
|---|---|---|---|---|---|
| (0,0) | (1,0) | (2,0) | (3,0) | (4,0) | (5,0) |
| (0,1) | (1,1) | (2,1) | (3,1) | (4,1) | (5,1) |
| (0,2) | (1,2) | (2,2) | (3,2) | (4,2) | (5,2) |
| (0,3) | (1,3) | (2,3) | (3,3) | (4,3) | (5,3) |
| (0,4) | (1,4) | (2,4) | (3,4) | (4,4) | (5,4) |
| (0,5) | (1,5) | (2,5) | (3,5) | (4,5) | (5,5) |

FIG. 17

| | | | | | |
|---|---|---|---|---|---|
| (0,0) | (3,0) | (0,0) | (3,0) | (0,0) | (3,0) |
| (0,3) | (3,3) | (0,3) | (3,3) | (0,3) | (3,3) |
| (0,0) | (3,0) | (0,0) | (3,0) | (0,0) | (3,0) |
| (0,3) | (3,3) | (0,3) | (3,3) | (0,3) | (3,3) |
| (0,0) | (3,0) | (0,0) | (3,0) | (0,0) | (3,0) |
| (0,3) | (3,3) | (0,3) | (3,3) | (0,3) | (3,3) |

| | | | | | |
|---|---|---|---|---|---|
| (1,0) | (4,0) | (1,0) | (4,0) | (1,0) | (4,0) |
| (1,3) | (4,3) | (1,3) | (4,3) | (1,3) | (4,3) |
| (1,0) | (4,0) | (1,0) | (4,0) | (1,0) | (4,0) |
| (1,3) | (4,3) | (1,3) | (4,3) | (1,3) | (4,3) |
| (1,0) | (4,0) | (1,0) | (4,0) | (1,0) | (4,0) |
| (1,3) | (4,3) | (1,3) | (4,3) | (1,3) | (4,3) |

| | | | | | |
|---|---|---|---|---|---|
| (2,0) | (5,0) | (2,0) | (5,0) | (2,0) | (5,0) |
| (2,3) | (5,3) | (2,3) | (5,3) | (2,3) | (5,3) |
| (2,0) | (5,0) | (2,0) | (5,0) | (2,0) | (5,0) |
| (2,3) | (5,3) | (2,3) | (5,3) | (2,3) | (5,3) |
| (2,0) | (5,0) | (2,0) | (5,0) | (2,0) | (5,0) |
| (2,3) | (5,3) | (2,3) | (5,3) | (2,3) | (5,3) |

| | | | | | |
|---|---|---|---|---|---|
| (0,1) | (3,1) | (0,1) | (3,1) | (0,1) | (3,1) |
| (0,4) | (3,4) | (0,4) | (3,4) | (0,4) | (3,4) |
| (0,1) | (3,1) | (0,1) | (3,1) | (0,1) | (3,1) |
| (0,4) | (3,4) | (0,4) | (3,4) | (0,4) | (3,4) |
| (0,1) | (3,1) | (0,1) | (3,1) | (0,1) | (3,1) |
| (0,4) | (3,4) | (0,4) | (3,4) | (0,4) | (3,4) |

| | | | | | |
|---|---|---|---|---|---|
| (1,1) | (4,1) | (1,1) | (4,1) | (1,1) | (4,1) |
| (1,4) | (4,4) | (1,4) | (4,4) | (1,4) | (4,4) |
| (1,1) | (4,1) | (1,1) | (4,1) | (1,1) | (4,1) |
| (1,4) | (4,4) | (1,4) | (4,4) | (1,4) | (4,4) |
| (1,1) | (4,1) | (1,1) | (4,1) | (1,1) | (4,1) |
| (1,4) | (4,4) | (1,4) | (4,4) | (1,4) | (4,4) |

| | | | | | |
|---|---|---|---|---|---|
| (2,1) | (5,1) | (2,1) | (5,1) | (2,1) | (5,1) |
| (2,4) | (5,4) | (2,4) | (5,4) | (2,4) | (5,4) |
| (2,1) | (5,1) | (2,1) | (5,1) | (2,1) | (5,1) |
| (2,4) | (5,4) | (2,4) | (5,4) | (2,4) | (5,4) |
| (2,1) | (5,1) | (2,1) | (5,1) | (2,1) | (5,1) |
| (2,4) | (5,4) | (2,4) | (5,4) | (2,4) | (5,4) |

| | | | | | |
|---|---|---|---|---|---|
| (0,2) | (3,2) | (0,2) | (3,2) | (0,2) | (3,2) |
| (0,5) | (3,5) | (0,5) | (3,5) | (0,5) | (3,5) |
| (0,2) | (3,2) | (0,2) | (3,2) | (0,2) | (3,2) |
| (0,5) | (3,5) | (0,5) | (3,5) | (0,5) | (3,5) |
| (0,2) | (3,2) | (0,2) | (3,2) | (0,2) | (3,2) |
| (0,5) | (3,5) | (0,5) | (3,5) | (0,5) | (3,5) |

| | | | | | |
|---|---|---|---|---|---|
| (1,2) | (4,2) | (1,2) | (4,2) | (1,2) | (4,2) |
| (1,5) | (4,5) | (1,5) | (4,5) | (1,5) | (4,5) |
| (1,2) | (4,2) | (1,2) | (4,2) | (1,2) | (4,2) |
| (1,5) | (4,5) | (1,5) | (4,5) | (1,5) | (4,5) |
| (1,2) | (4,2) | (1,2) | (4,2) | (1,2) | (4,2) |
| (1,5) | (4,5) | (1,5) | (4,5) | (1,5) | (4,5) |

| | | | | | |
|---|---|---|---|---|---|
| (2,2) | (5,2) | (2,2) | (5,2) | (2,2) | (5,2) |
| (2,5) | (5,5) | (2,5) | (5,5) | (2,5) | (5,5) |
| (2,2) | (5,2) | (2,2) | (5,2) | (2,2) | (5,2) |
| (2,5) | (5,5) | (2,5) | (5,5) | (2,5) | (5,5) |
| (2,2) | (5,2) | (2,2) | (5,2) | (2,2) | (5,2) |
| (2,5) | (5,5) | (2,5) | (5,5) | (2,5) | (5,5) |

FIG. 18

| | | | | | |
|---|---|---|---|---|---|
| (0,0) | (3,0) | (0,0) | (3,0) | (0,0) | (3,0) |
| (0,3) | (3,3) | (0,3) | (3,3) | (0,3) | (3,3) |
| (0,0) | (3,0) | (0,0) | (3,0) | (0,0) | (3,0) |
| (0,3) | (3,3) | (0,3) | (3,3) | (0,3) | (3,3) |
| (0,0) | (3,0) | (0,0) | (3,0) | (0,0) | (3,0) |
| (0,3) | (3,3) | (0,3) | (3,3) | (0,3) | (3,3) |

| | | | | | |
|---|---|---|---|---|---|
| (1,0) | (4,0) | (1,0) | (4,0) | (1,0) | (4,0) |
| (1,3) | (4,3) | (1,3) | (4,3) | (1,3) | (4,3) |
| (1,0) | (4,0) | (1,0) | (4,0) | (1,0) | (4,0) |
| (1,3) | (4,3) | (1,3) | (4,3) | (1,3) | (4,3) |
| (1,0) | (4,0) | (1,0) | (4,0) | (1,0) | (4,0) |
| (1,3) | (4,3) | (1,3) | (4,3) | (1,3) | (4,3) |

| | | | | | |
|---|---|---|---|---|---|
| (2,0) | (5,0) | (2,0) | (5,0) | (2,0) | (5,0) |
| (2,3) | (5,3) | (2,3) | (5,3) | (2,3) | (5,3) |
| (2,0) | (5,0) | (2,0) | (5,0) | (2,0) | (5,0) |
| (2,3) | (5,3) | (2,3) | (5,3) | (2,3) | (5,3) |
| (2,0) | (5,0) | (2,0) | (5,0) | (2,0) | (5,0) |
| (2,3) | (5,3) | (2,3) | (5,3) | (2,3) | (5,3) |

| | | | | | |
|---|---|---|---|---|---|
| (0,1) | (3,1) | (0,1) | (3,1) | (0,1) | (3,1) |
| (0,4) | (3,4) | (0,4) | (3,4) | (0,4) | (3,4) |
| (0,1) | (3,1) | (0,1) | (3,1) | (0,1) | (3,1) |
| (0,4) | (3,4) | (0,4) | (3,4) | (0,4) | (3,4) |
| (0,1) | (3,1) | (0,1) | (3,1) | (0,1) | (3,1) |
| (0,4) | (3,4) | (0,4) | (3,4) | (0,4) | (3,4) |

| | | | | | |
|---|---|---|---|---|---|
| (1,1) | (4,1) | (1,1) | (4,1) | (1,1) | (4,1) |
| (1,4) | (4,4) | (1,4) | (4,4) | (1,4) | (4,4) |
| (1,1) | (4,1) | (1,1) | (4,1) | (1,1) | (4,1) |
| (1,4) | (4,4) | (1,4) | (4,4) | (1,4) | (4,4) |
| (1,1) | (4,1) | (1,1) | (4,1) | (1,1) | (4,1) |
| (1,4) | (4,4) | (1,4) | (4,4) | (1,4) | (4,4) |

| | | | | | |
|---|---|---|---|---|---|
| (2,1) | (5,1) | (2,1) | (5,1) | (2,1) | (5,1) |
| (2,4) | (5,4) | (2,4) | (5,4) | (2,4) | (5,4) |
| (2,1) | (5,1) | (2,1) | (5,1) | (2,1) | (5,1) |
| (2,4) | (5,4) | (2,4) | (5,4) | (2,4) | (5,4) |
| (2,1) | (5,1) | (2,1) | (5,1) | (2,1) | (5,1) |
| (2,4) | (5,4) | (2,4) | (5,4) | (2,4) | (5,4) |

| | | | | | |
|---|---|---|---|---|---|
| (0,2) | (3,2) | (0,2) | (3,2) | (0,2) | (3,2) |
| (0,5) | (3,5) | (0,5) | (3,5) | (0,5) | (3,5) |
| (0,2) | (3,2) | (0,2) | (3,2) | (0,2) | (3,2) |
| (0,5) | (3,5) | (0,5) | (3,5) | (0,5) | (3,5) |
| (0,2) | (3,2) | (0,2) | (3,2) | (0,2) | (3,2) |
| (0,5) | (3,5) | (0,5) | (3,5) | (0,5) | (3,5) |

| | | | | | |
|---|---|---|---|---|---|
| (1,2) | (4,2) | (1,2) | (4,2) | (1,2) | (4,2) |
| (1,5) | (4,5) | (1,5) | (4,5) | (1,5) | (4,5) |
| (1,2) | (4,2) | (1,2) | (4,2) | (1,2) | (4,2) |
| (1,5) | (4,5) | (1,5) | (4,5) | (1,5) | (4,5) |
| (1,2) | (4,2) | (1,2) | (4,2) | (1,2) | (4,2) |
| (1,5) | (4,5) | (1,5) | (4,5) | (1,5) | (4,5) |

| | | | | | |
|---|---|---|---|---|---|
| (2,2) | (5,2) | (2,2) | (5,2) | (2,2) | (5,2) |
| (2,5) | (5,5) | (2,5) | (5,5) | (2,5) | (5,5) |
| (2,2) | (5,2) | (2,2) | (5,2) | (2,2) | (5,2) |
| (2,5) | (5,5) | (2,5) | (5,5) | (2,5) | (5,5) |
| (2,2) | (5,2) | (2,2) | (5,2) | (2,2) | (5,2) |
| (2,5) | (5,5) | (2,5) | (5,5) | (2,5) | (5,5) |

FIG. 19

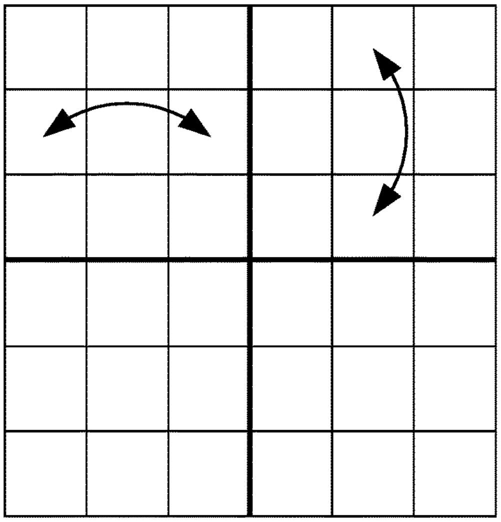
FIG. 23
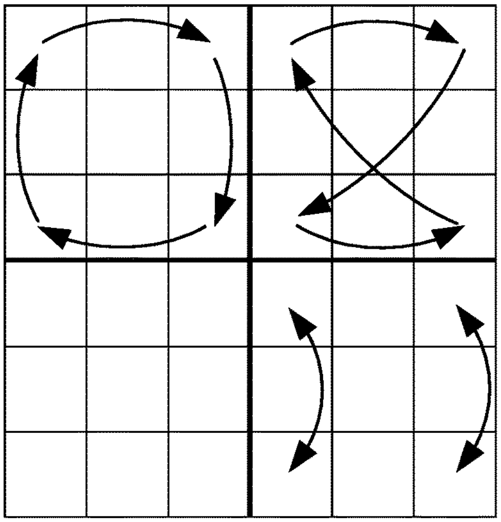
FIG. 24
| | | | | | |
|---|---|---|---|---|---|
| G | G | G | B | B | R |
| R | R | B | G | G | B |
| R | B | B | R | R | G |
| R | B | G | R | G | B |
| R | G | G | B | B | R |
| B | R | B | G | R | G |
FIG. 25

NONA-PIXEL COLOR FILTER ARRAY

CROSS-REFERENCE TO RELATED APPLICATION

This application is a national stage application under 35 U.S.C. § 371 of International Application No. PCT/EP2022/067700, entitled "NONA-PIXEL COLOR FILTER ARRAY," filed on Jun. 28, 2022, which claims priority of European Patent Application No. EP21305922, filed 2 Jul. 2021, which are incorporated herein by reference in their entirety.

BACKGROUND

The present disclosure relates to plenoptic cameras. A plenoptic camera is similar to a common camera with a lens system and a light sensor, with the addition of a micro-lens array over the micro-image sensor. Each micro-lens produces a micro-image on the sensor. The resulting plenoptic image may be referred to as a 4D light field which gives indications on the sensor and pupil coordinates of the photon trajectory. For later display and processing, the 4D light field may be processed through an operation known as projection into a 2D re-focused image. The projection operation allows for the possibility of tuning the focalization distance.

In some plenoptic cameras, each pixel of the light sensor is covered by a color filter that primarily allows light of one color to reach the corresponding pixel. In some such cameras, the color filters are arranged as a so-called Bayer filter. The conventional Bayer filter allows one color—red, green or blue—to be recorded by each corresponding pixel. When an image has been captured using a Bayer filter, each pixel has only one associated color value, corresponding to the color of the filter associated with that pixel. From this image, it may be desirable to obtain an image in which each of the pixels has all three color values. This may be done with processing to obtain the two missing color values for each pixel. Such processing techniques are referred to as demosaicing. Demosaicing can be a non-trivial process, particularly for images or regions of images that cover highly textured areas.

Bayer color filters have been used with plenoptic cameras. To process 4D light field images captured with such cameras, demosaicing may be performed concurrently with a 2D refocusing process.

Plenoptic Sampling of 4D Light-Field Data.

Conventional plenoptic cameras are similar to ordinary 2D cameras with the addition of a micro-lens array set just in front of the sensor as illustrated schematically in FIG. 1. The sensor pixels under each micro-lens record a respective micro-lens image.

Plenoptic cameras record 4D light-field data which can be transformed into various by-products such as re-focused images with freely selected distances of focalization.

The sensor of a light-field camera records an image which is made of a collection of 2D small images arranged within a larger 2D image. Each micro-lens in the array, and each corresponding small micro-lens image generated under that lens, may be indexed by the coordinates (i,j). The pixels of the light field may be associated to four coordinates (x,y,i,j), where (x,y) identifies the location of the pixel in the complete image. The 4D light field recorded by the sensor may be represented by L(x,y,i,j). FIG. 2 schematically illustrates the image which is recorded by the sensor. Each micro-lens produces a micro-image which is schematically represented by a circle (the shape of the small image depends on the shape of the micro-lenses which is typically circular). Pixel coordinates are labelled (x,y). p is the distance between two consecutive micro-images. p is not necessary an integer value. Micro-lenses are chosen such that p is larger than a pixel size δ. Micro-lens images are referenced by their coordinate (i,j). Each micro-lens image samples the pupil of the main lens with the (u,v) coordinate system. Some pixels might not receive any photons from any micro-lens; those pixels may be disregarded. Indeed, the inter micro-lens space may be masked out to prevent photons to pass outside from a micro-lens (if the micro-lenses have a square shape, no masking is needed). The center of a micro-lens image (i,j) is located on the sensor at the coordinate ($x_{i,j}$, $y_{i,j}$). θ is the angle between the square lattice of pixel and the square lattice of micro-lenses. In FIG. 2, θ=0. Assuming the micro-lenses are arranged according to a regular square lattice, the ($x_{i,j}$, $y_{i,j}$) can be computed by the following equation considering ($x_{0,0}$, $y_{0,0}$) the pixel coordinate of the micro-lens image (0,0):

$$\begin{bmatrix} x_{i,j} \\ y_{i,j} \end{bmatrix} = p\begin{bmatrix} \cos\theta & -\sin\theta \\ \sin\theta & \cos\theta \end{bmatrix}\begin{bmatrix} i \\ j \end{bmatrix} + \begin{bmatrix} x_{0,0} \\ y_{0,0} \end{bmatrix} \quad (1)$$

FIG. 2 also illustrates that an object from the scene may be visible on several contiguous micro-lens images, with each image being illustrated as a dark square dot. The distance between two consecutive views of an object is w. This distance w is referred to herein as the replication distance. An object is theoretically visible on r consecutive micro-lens images with $$r = \left\lfloor \frac{p}{|p-w|} \right\rfloor \quad (2)$$

where r is the number of consecutive micro-lens images in one dimension, and ⌊ . . . ⌋ is the floor function. An object is theoretically visible in $r^2$ micro-lens images. Depending on the shape of the micro-lens image, some of the $r^2$ views of the object might be invisible.

Optical Properties of Light-Field Cameras.

The distances p and w introduced in the previous subsection are given in unit of pixel size. They can be converted into physical unit distances (e.g. meters), respectively P and W, by multiplying them by the pixel size δ, such that W=δw and P=δp. These distances can vary depending on the light-field camera characteristics.

FIG. 3 and FIG. 4 are schematic side illustrations of different light-field cameras assuming a perfect thin-lens model. The main lens in these examples has a focal length F and an aperture Φ. The micro-lens array is made of micro-lenses having a focal length f. The pitch of the micro-lens array is ϕ. The micro-lens array is located at a distance D from the main-lens, and a distance d from the sensor. The object (not visible on the figures) is located at a distance z from the main-lens (toward the left). This object is focused by the main lens at a distance z' from the main lens (toward the right). FIG. 3 illustrates the case where D>z', and FIG. 4 illustrates the case where D<z'. In both cases, the micro-lens images can be in focus depending on d and f. FIGS. 3 and 4 illustrate examples of so-called type II plenoptic cameras.

In an alternative light-field camera design referred to as a type I plenoptic camera, the parameters are selected such that f=d. An example of such a design is illustrated in FIG.

5. This design is made such that the main-lens is focusing images close to the micro-lens array. If the main-lens is focusing exactly on the micro-lens array, then W=∞. Also the micro-lens images are fully out-of-focus and equal to a constant (not considering noise).

The replication distance W varies with the z, the distance of the object. To establish the relation between W and z, one may refer to the thin lens equation $$\frac{1}{z}+\frac{1}{z'}=\frac{1}{F} \tag{3}$$

and to Thales law $$\frac{D-z'}{\phi}=\frac{D-z'+d}{W} \tag{4}$$

Combining the previous two equations, one can deduce $$W=\phi\left(1+\frac{d}{D-\frac{zF}{z-F}}\right) \tag{5}$$

The relation between W and z does not assume that the micro-lens images are in focus. Micro-lens images may be in focus when thin lens equation is satisfied such that $$\frac{1}{D-z'}+\frac{1}{d}=\frac{1}{f} \tag{6}$$

Also from the Thales law one derives P as follows.

$$e=\frac{D+d}{D} \qquad P=\phi e \tag{7}$$

The ratio e defines the enlargement between the micro-lens pitch and the micro-lens images pitch. This ratio is very close to 1 since D>> d.

Sub-Aperture Images.

Some of the plenoptic cameras as described above have the following properties: the micro-lens array has a square lattice (like the pixel array) and has no rotation versus the pixels; and the micro-lens image diameter is equal to an integer number of pixels (or almost equal to an integer number of pixels). These properties are satisfied by most feasible plenoptic sensors. These properties allow for the generation of images known as sub-aperture images.

A sub-aperture image collects all of the 4D light-field pixels having the same relative position within their respective micro-lens image, for example all of the pixels having the same (u,v) coordinates. If the array of micro-lenses has the size I×J, then each sub-aperture image also has size I×J. And if there is a p×p array of pixels under each micro-lens, then there are p×p sub-aperture images. If the number of pixels of the sensor is $N_x \times N_y$, then each sub-aperture image may have the size of $N_x/p \times N_y/p$.

FIGS. 6A-6B schematically illustrate a conversion from a captured light-field image L(x,y,i,j) into a series of sub-aperture images S(α,β, u, v). FIG. 6A illustrates a light-field image (with size 24×16 pixels in this simplified example, although real-world examples generally include many more pixels), with each pixel position being given by coordinates (x,y). Each of the micro-lenses (illustrated schematically by a circle) is associated with a 4×4 micro-image, with positions in the micro-image being given by coordinates (u,v). The micro-images are arranged in a 6×4 array, with each micro-image being indexed by coordinates (i,j). As seen in FIG. 6A, an object (represented by a solid round dot) is imaged in nine of the micro-images.

FIG. 6B illustrates sixteen, i.e. 4×4, sub-aperture images generated from the light field of FIG. 6A. Each sub-aperture image has a size of I×J pixels (6×4 in this simplified example, corresponding to the number of micro-images). A position within each sub-aperture image is indicated by coordinates (α,β), where 0≤α<I and 0≤β<J. Each 2D sub-aperture image may be identified by pupil coordinates (u,v), and it may be denoted by S(u,v).

An example of generating a sub-aperture image from a light-field image is as follows. In FIG. 6A, the top-left pixel of each micro-image within the light-field image is shaded. All of these pixels are combined into a single sub-aperture image, namely the sub-aperture image at the top-left of FIG. 6B.

The relations between (x,y,i,j) and (α,β, u, v) may be expressed as follows:

$$(\alpha,\beta,u,v)=\left(\left\lfloor\frac{x}{p}\right\rfloor,\left\lfloor\frac{y}{p}\right\rfloor,x \bmod p, y \bmod p\right) \tag{8}$$

where ⌊.⌋ denotes the floor function, and mod denotes the modulo function.

If p is not exactly an integer but close to an integer, then the sub-aperture images can be computed by considering the distance between the micro-lens image equal to ⌊p⌋ the integer just greater than p. This case occurs especially when the micro-lens diameter ϕ is equal to an integer number of pixels. In the case, p=ϕe being slightly larger than ϕ since e=(D+d)/d is slightly greater than 1. The advantage of considering ⌊p⌋ is that the sub-aperture images are computed without interpolation since one pixel L(x,y,i,j) corresponds to an integer coordinate sub-aperture pixel S(α,β, u, v). The drawback is that the portion of a the pupil from which photons are recorded is not constant within a given sub-aperture image S(u,v). As a result, S(u,v) sub-aperture image is not exactly sampling the (u,v) pupil coordinate.

In cases where p is not an integer, or where the micro-lens array is rotated versus the pixel array, then the sub-aperture images may be computed using interpolation since the centers $(x_{i,j}, u_{i,j})$ of the micro-lenses are not at integer coordinates.

Within the light-field image L(x,y,i,j) an object is made visible on several micro-images with a replication distance w. On the sub-aperture images, an object is also visible several times. From one sub-aperture image to the next horizontal one, an object coordinate (α,β) appears shifted by the disparity ρ. The relation between ρ and w can be expressed by:

$$\rho=\frac{1}{w-p} \tag{9}$$

Also it is possible to establish a relation between the disparity ρ and the distance z of the object by combining equations (5) and (9):

$$\rho = \frac{\delta D}{\phi d}\left(\frac{D}{z'} - 1\right) \quad (10)$$

Projecting Light-Field Pixels on a Re-Focus Image.

Image refocusing consists in projecting the light-field pixels L(x,y,i,j) recorded by the sensor into a 2D refocused image of coordinate (X,Y). The projection may be performed by shifting the micro-images (i,j):

$$\begin{bmatrix} X \\ Y \end{bmatrix} = s\begin{bmatrix} x \\ y \end{bmatrix} - sw_{focus}\begin{bmatrix} i \\ j \end{bmatrix} \quad (11)$$

where $w_{focus}$ is the selected replication distance corresponding to $z_{focus}$ the distance of the objects that appear in focus in the computed refocused image. s is a zoom factor which controls the size of the refocused image. The value of the light-field pixel L(x,y,i,j) is added on the refocused image at coordinate (X,Y). If the projected coordinate is non-integer, the pixel is added using interpolation. To record the number of pixels projected into the refocused image, a weight-map image having the same size as the refocused image is created. This image is preliminary set to 0. For each light-field pixel projected on the refocused image, the value of 1.0 is added to the weight-map at the coordinate (X,Y). If interpolation is used, the same interpolation kernel is used for both the refocused and the weight-map images. After all of the light-field pixels are projected, the refocused image is divided pixel per pixel by the weight-map image. This normalization step provides for brightness consistency of the normalized refocused image.

Addition of the Sub-Aperture Images to Compute the Re-Focus Image.

In another technique of performing refocusing, the refocused images can be computed by summing-up the sub-aperture images S(α,β) taking into consideration the disparity $\rho_{focus}$ for which objects at distance $z_{focus}$ are in focus.

$$\begin{bmatrix} X \\ Y \end{bmatrix} = s\begin{bmatrix} \alpha \\ \beta \end{bmatrix} + s\rho_{focus}\begin{bmatrix} u \\ v \end{bmatrix} \quad (12)$$

The sub-aperture pixels are projected on the refocused image, and a weight-map records the contribution of this pixel, following the same procedure described above.

SUMMARY

An apparatus according to some embodiments includes a color filter system comprising a repeated 6×6 pattern of filter pixels, each filter pixel being identifiable by integer coordinates (m,n) indicating the row and column position of the respective filter pixel within the pattern, where 0≤m≤5 and 0≤n≤5, and each filter pixel having either a first, a second, or a third color; wherein, in each of the following groups of nine filter pixels, three have the first color, three have the second color, and three have the third color:

(a) the nine filter pixels with both m=0, 1, or 2 and n=0, 1, or 2;

(b) the nine filter pixels with both m=3, 4, or 5 and n=0, 1, or 2;

(c) the nine filter pixels with both m=0, 1, or 2 and n=3, 4, or 5;

(d) the nine filter pixels with both m=3, 4, or 5 and n=3, 4, or 5;

(e) the nine filter pixels with both m=0, 2, or 4 and n=0, 2, or 4;

(f) the nine filter pixels with both m=1, 3, or 5 and n=0, 2, or 4;

(g) the nine filter pixels with both m=0, 2, or 4 and n=1, 3, or 5; and (h) the nine filter pixels with both m=1, 3, or 5 and n=1, 3, or 5.

In some embodiments, each filter pixel (m,n) with m≤2 has a different color than filter pixel (m+3, n); and each filter pixel (m,n) with n≤2 has a different color than filter pixel (m, n+3).

In some embodiments, the 6×6 pattern of filter pixels is arranged in the following pattern, or in a rotated or reflected version of the following pattern, where a "1" indicates the first color, a "2" indicates the second color, and a "3" indicates the third color:

| | | | | | |
|---|---|---|---|---|---|
| 2 | 2 | 1 | 3 | 3 | 2 |
| 3 | 1 | 1 | 2 | 2 | 3 |
| 2 | 3 | 3 | 1 | 1 | 1 |
| 3 | 3 | 2 | 1 | 1 | 3 |
| 1 | 2 | 2 | 3 | 3 | 1 |
| 3 | 1 | 1 | 2 | 2 | 2 |

In some embodiments, the 6×6 pattern of filter pixels is arranged in the following pattern, or in a rotated or reflected version of the following pattern, where a "1" indicates the first color, a "2" indicates the second color, and a "3" indicates the third color:

| | | | | | |
|---|---|---|---|---|---|
| 1 | 1 | 2 | 2 | 2 | 3 |
| 1 | 3 | 2 | 2 | 1 | 3 |
| 2 | 3 | 3 | 3 | 1 | 1 |
| 2 | 2 | 3 | 3 | 3 | 1 |
| 3 | 2 | 1 | 1 | 3 | 2 |
| 3 | 1 | 1 | 1 | 2 | 2 |

Some embodiments of the apparatus further comprise a light sensor array having a plurality of sensor pixels, wherein each of the filter pixels overlays a corresponding one of the sensor pixels.

Some embodiments further comprise an array of micro-lenses, wherein each of the micro-lenses overlays a respective 3×3 quadrant within the 6×6 pattern of filter pixels. Some such embodiments further comprise a main lens operative to focus light toward the array of micro-lenses.

In some embodiments, the first color is red, the second color is green, and the third color is blue.

In some embodiments, the first color is cyan, the second color is magenta, and the third color is yellow.

A plenoptic sensor according to some embodiments includes a plurality of microlenses, a respective 3×3 array of color filter pixels under each microlens, and an array of sensor pixels under the color filter pixels configured to capture a plenoptic image. Each of the color filter pixels has either a first color, a second color, or a third color, and the colors of the color filter pixels are arranged such that (i) each of the sub-aperture image generated from the plenoptic image has an extended Bayer pattern, and (ii) the pixels of a refocused image generated by adding the sub-aperture images with a disparity value of zero or one receive contributions from three pixels of the first color, three pixels of the second color, and three pixels of the third color.

Embodiments described herein further include plenoptic images stored on non-transitory storage media, methods for demosaicing and/or refocusing images captured using the described plenoptic sensors, and processors and instructions stored on non-transitory storage media for performing demosaicing and/or refocusing of images captured using the described plenoptic sensors.

BRIEF DESCRIPTION OF THE DRAWINGS

FIGS. 7A-7B illustrate color filter arrays for conventional non-plenoptic sensors. FIG. 7A illustrates a conventional Bayer pattern. FIG. 7B illustrates a quad-Bayer coding (CBC) or tetra-cell pattern. FIGS. 7C-7D illustrate color filter arrays for plenoptic sensors. FIG. 7C illustrates a dual photo diode (DPD) array. FIG. 7D illustrates a quad Bayer coding (QBC) 2×2 on-chip lens (OCL) array.

FIG. 12A illustrates the color pattern resulting from refocusing an image from the sensor of FIG. 9A, using a shift of 0 or 2 modulo 3.

FIG. 12B illustrates the color pattern resulting from refocusing an image from the sensor of FIG. 9A, using a shift of 1 modulo 3.

FIG. 17 schematically illustrates the use of coordinates (m,n) to identify positions within a 6×6 color pattern.

FIG. 18 schematically illustrates nine sub-aperture images generated from the color filter array pattern of FIG. 17.

FIG. 19 illustrates the nine sub-aperture images of FIG. 18, with highlighting applied to identify an example set of nine pixels added together with disparity of one.

FIG. 23 illustrates examples of modifications that can be applied to some embodiments to generate other embodiments.

FIG. 24 illustrates examples of additional modifications that can be applied to some embodiments to generate other embodiments.

FIG. 25 illustrates an example of an embodiment that satisfies the color balancing conditions (within each quadrant and within each double-spaced square) without using extended Bayer patterns for all of the sub-aperture images.

DETAILED DESCRIPTION

Example embodiments include a color filter arrays (CFAs) for use with a plenoptic camera and cameras incorporating such CFAs. Some embodiments provide for simplified demosaicing for refocused images, e.g. demosaicing that is performed as an inherent product of the refocusing process. Some embodiments are arranged for use in a plenoptic sensor in which each micro-lens covers an array of 3×3 pixels, referred to herein as a nona-pixel plenoptic sensor.

Color Filter Arrays.

Figure 7B:
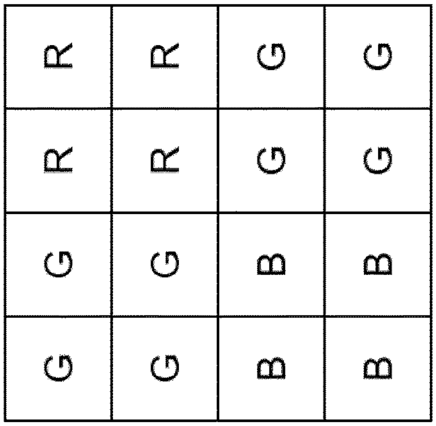
FIGS. 7A-7D illustrate different patterns of color filter arrays for image sensors. In the illustrations, each circle represents a micro-lens.
Figure 7D:
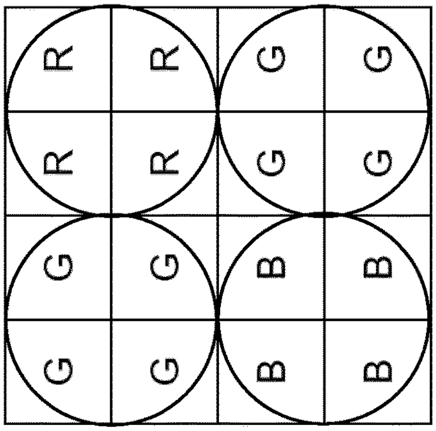
Figure 7A:
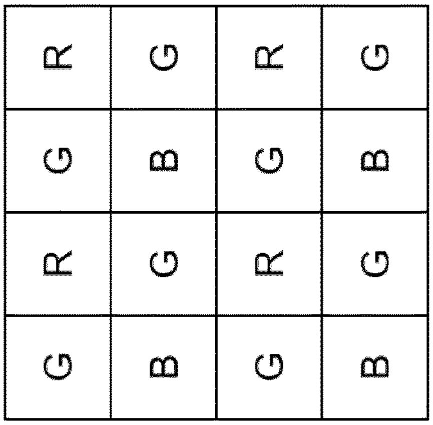
Figure 7C:
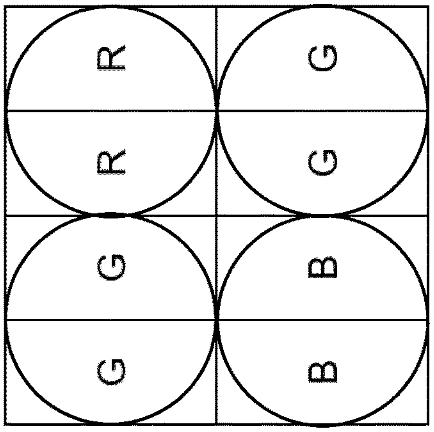

Various patterns of color filter arrays for image sensors are illustrated schematically in FIGS. 7A-7D. In the illustrations, each circle represents a micro-lens. FIGS. 7A-7B illustrate color filter arrays for conventional non-plenoptic sensors. FIG. 7A illustrates a conventional Bayer pattern. FIG. 7B illustrates a quad-Bayer coding (CBC) or tetra-cell pattern. FIGS. 7C-7D illustrate color filter arrays for plenoptic sensors. FIG. 7C illustrates a dual photo diode (DPD) array. FIG. 7D illustrates a quad Bayer coding (QBC) 2×2 on-chip lens (OCL) array. The illustrated patterns in FIGS. 7A-7D are repeated in a square matrix over a pixel array.

Figure 1:
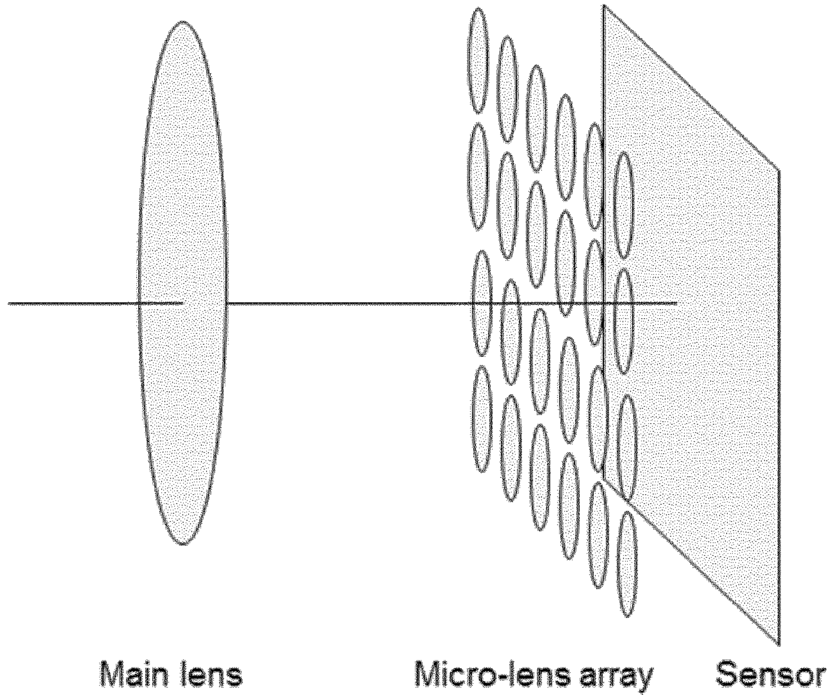
FIG. 1 is a schematic illustration of a plenoptic camera.
Figure 2:
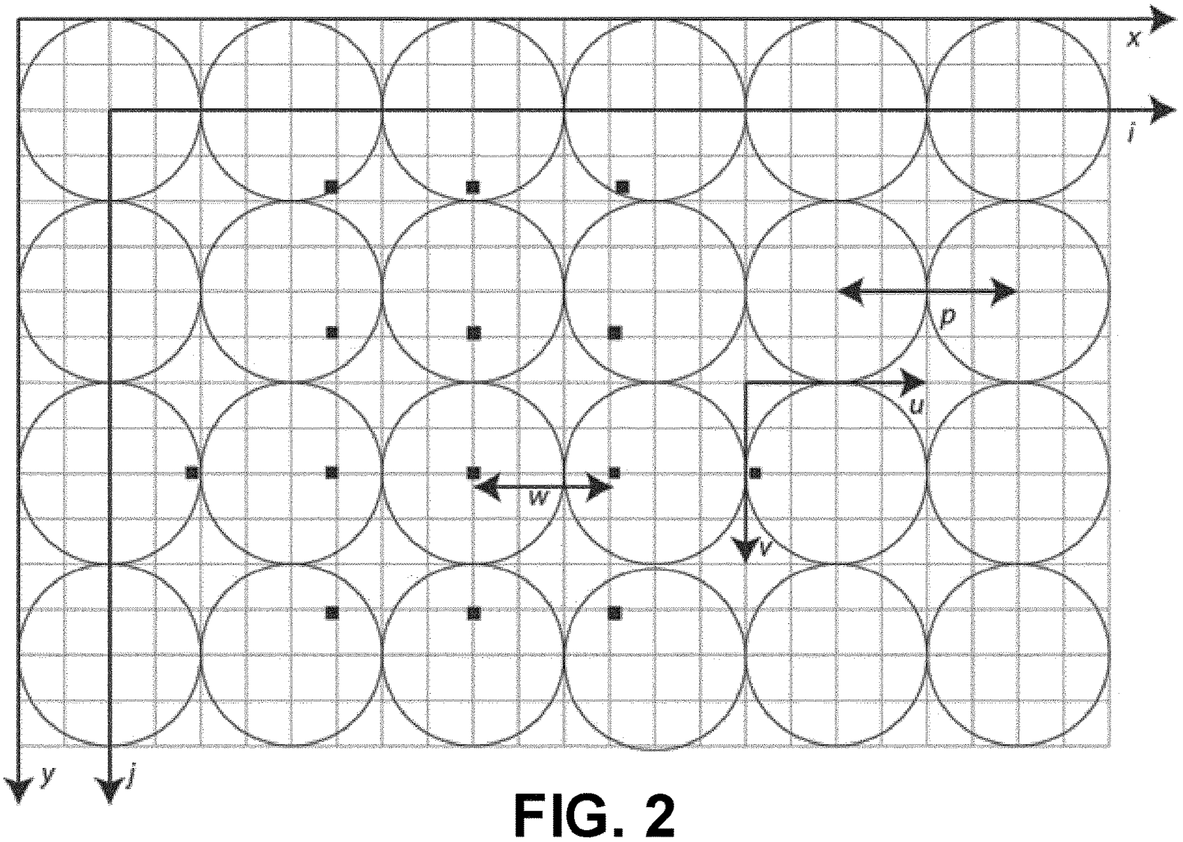
FIG. 2 is a schematic illustration of light field data recorded by a plenoptic sensor.
Figure 3:
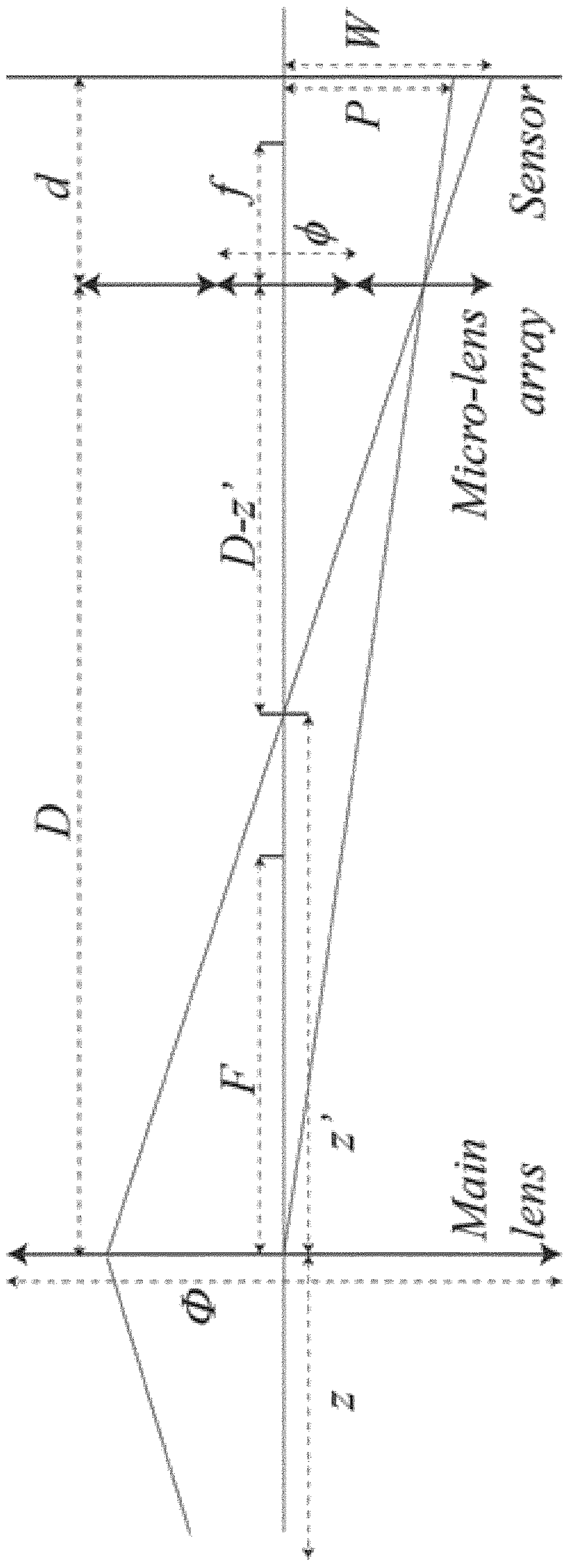
FIG. 3 is a schematic illustration of the parameters of a plenoptic type II camera with W>P.
Figure 4:
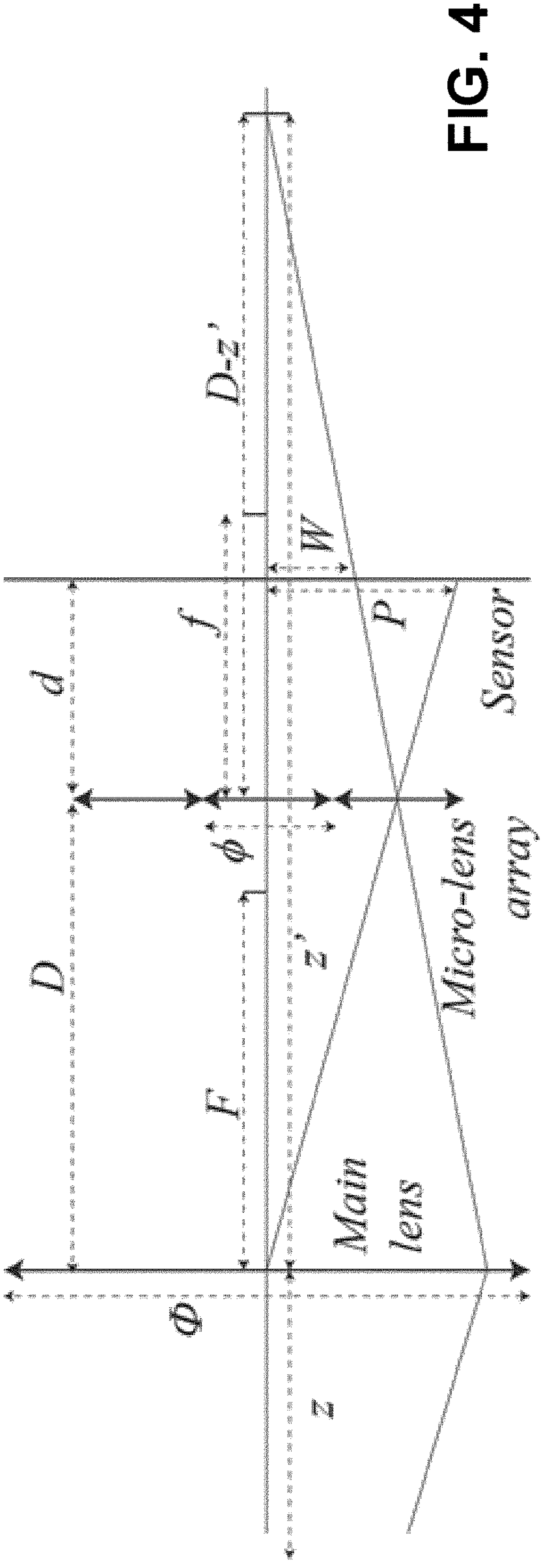
FIG. 4 is a schematic illustration of the parameters of a plenoptic type II camera with W<P.
Figure 5:
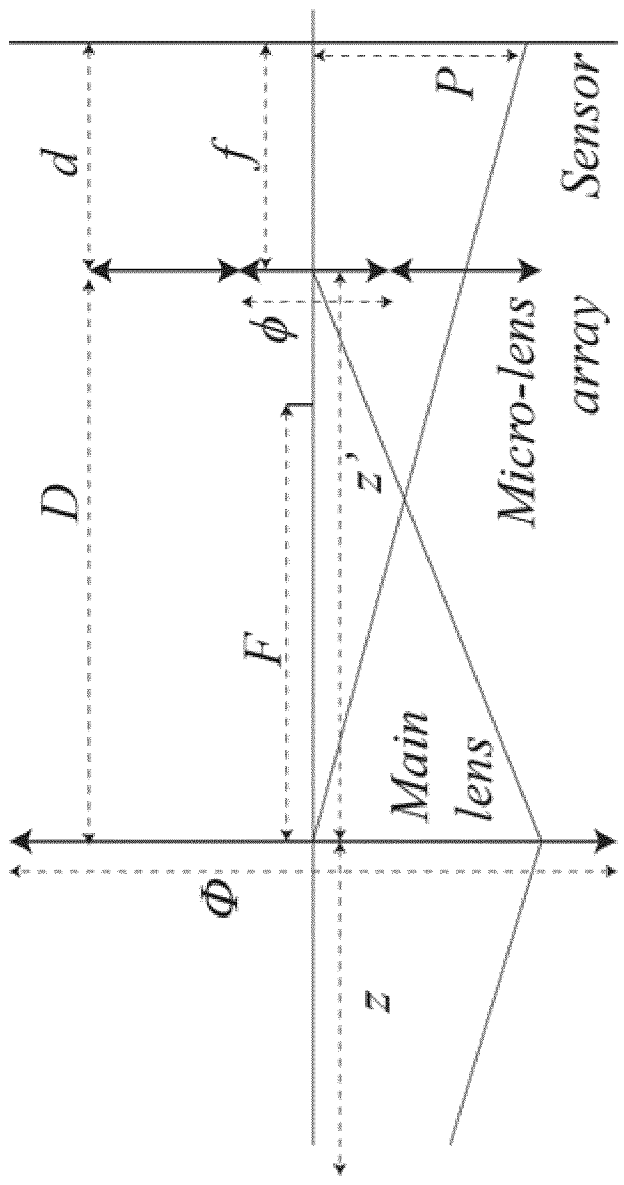
FIG. 5 is a schematic illustration of the parameters of a plenoptic type I camera with f=d.
Figure 6A:
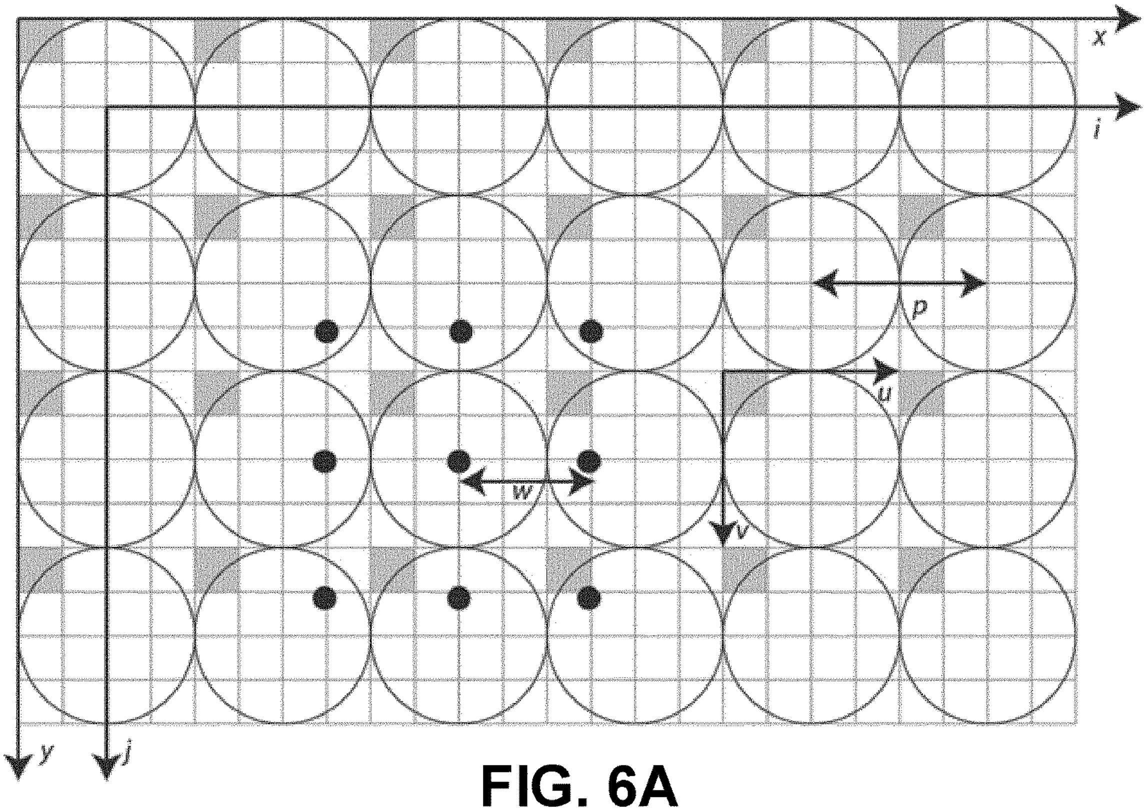
FIGS. 6A-6B are schematic illustrations of conversion of light-field pixels into sub-aperture images.
Figure 6B:
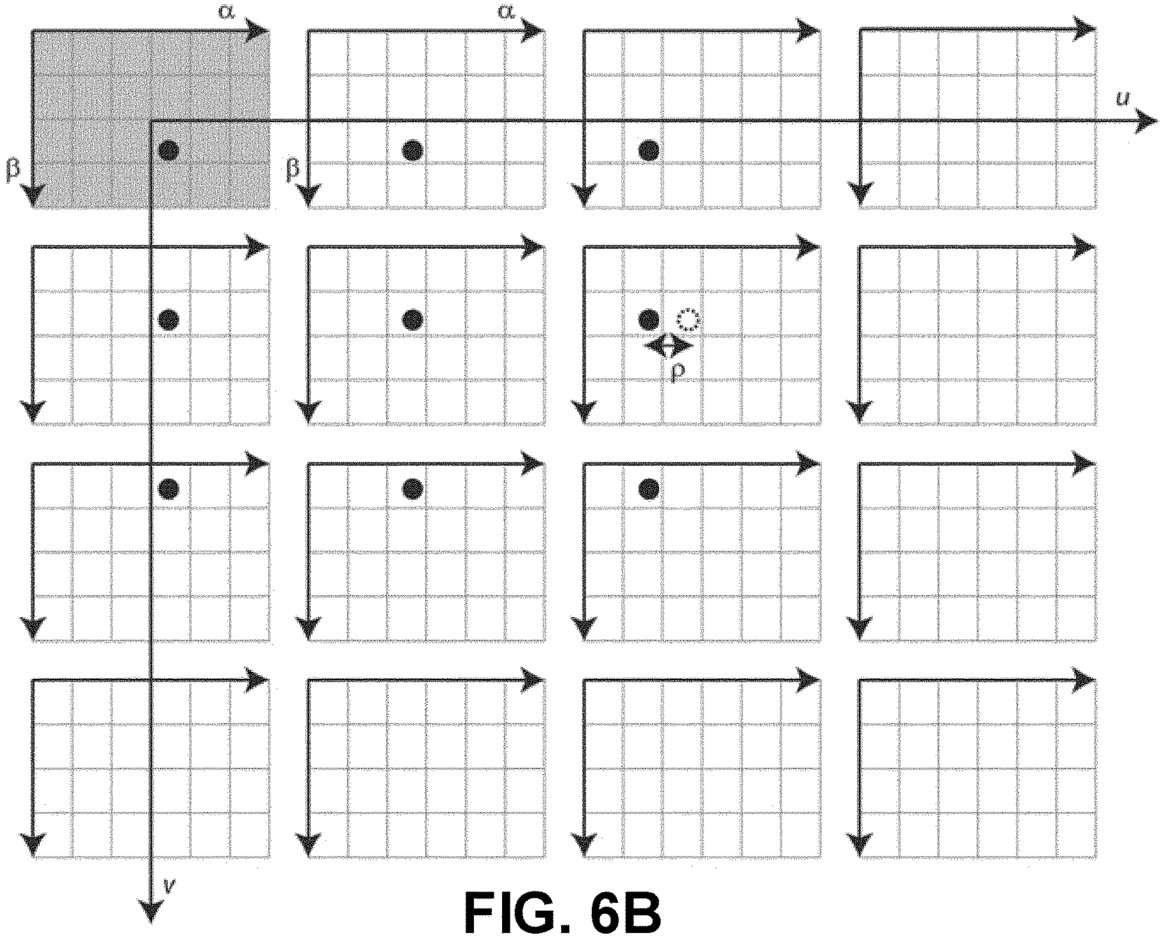
Figure 8:
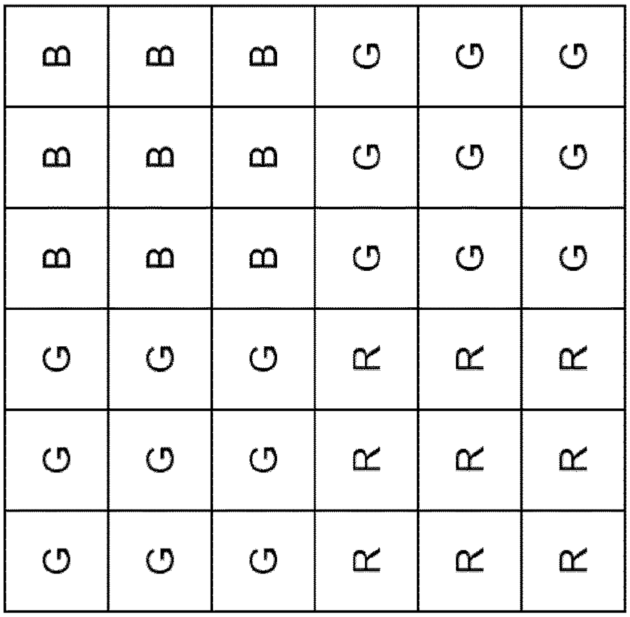
FIG. 8 illustrates a color filter pattern used in nonacell technology.

FIG. 8 illustrates a color filter pattern used in nonacell technology. Each color of the Bayer pattern covers a cell of 3×3 pixels. Each pixel may correspond to an area of approximately 2.4×2.4 μm.

The use of a micro-lens over more than one pixel may be used, for example, for live autofocus when shooting video. It may also be used to help algorithms to compute images with a shallow depth-of-field (having a bokeh as if the image had been shot with a large-sensor camera).

Nona-Pixel Plenoptic Sensors.

Some of the embodiments described herein relate to the use of nona-pixel plenoptic sensor technology. Nona-pixel refers herein to a plenoptic sensor in which each micro-lens covers a 3×3 array of light sensor pixels. Nona-pixel sensors may be used to enable applications such as tight refocusing and main-lens aberration correction.

Figure 9A:
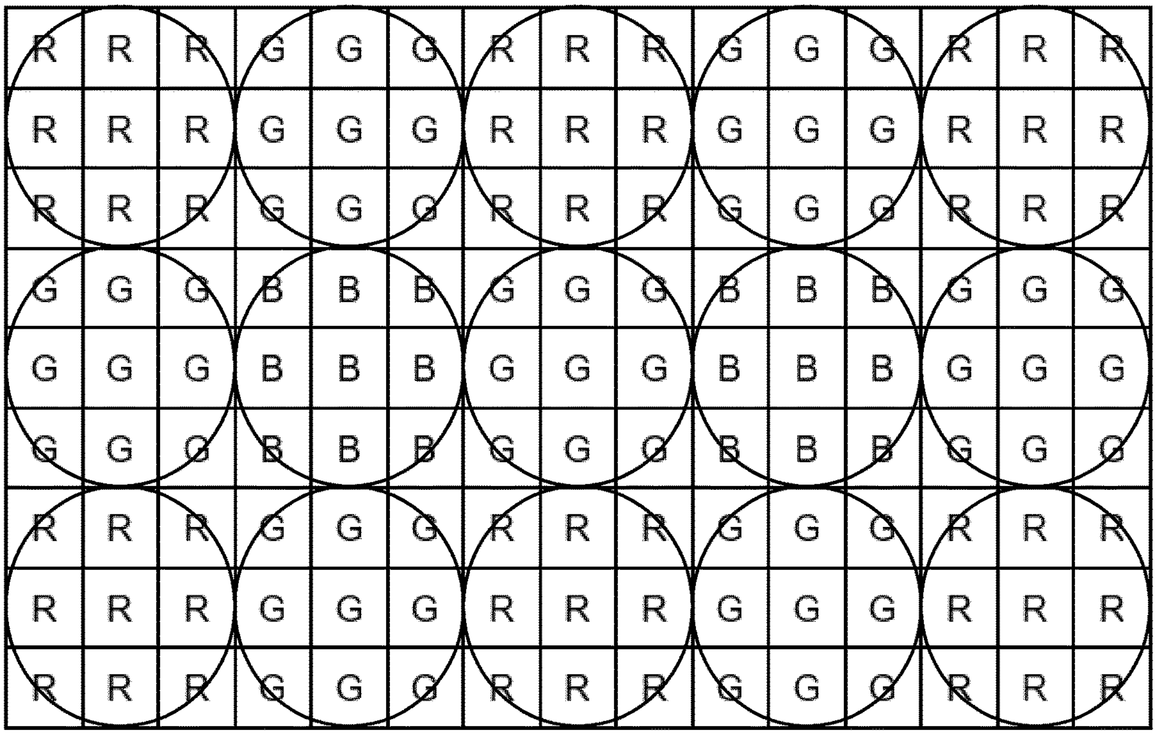
FIG. 9A illustrates a color filter array in which each micro-lens (illustrated schematically as a circle) is associated with one color of a Bayer pattern.
Figure 9B:
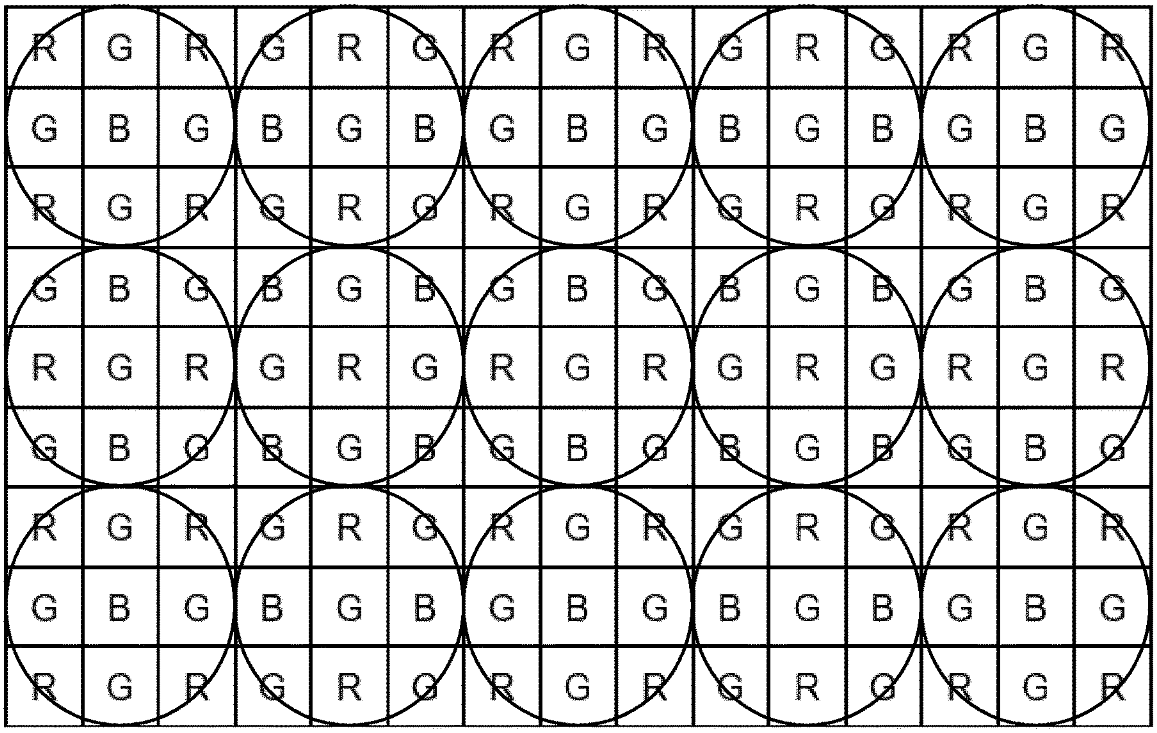
FIG. 9B illustrates a color filter array in which each sensor pixel is associated with one color of the Bayer pattern.
Figure 10A:
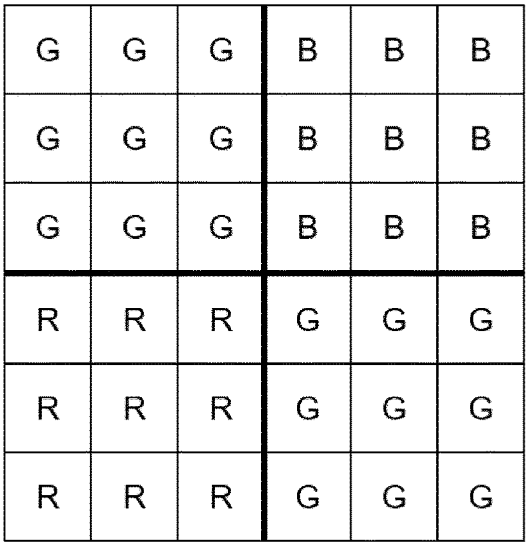
FIG. 10A illustrates the 2×2 color pattern that is replicated to generate the pattern of FIG. 9A.
Figure 10B:
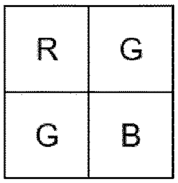
FIG. 10B illustrates the 2×2 color pattern that is replicated to generate the pattern of FIG. 9B.
Figure 10C:
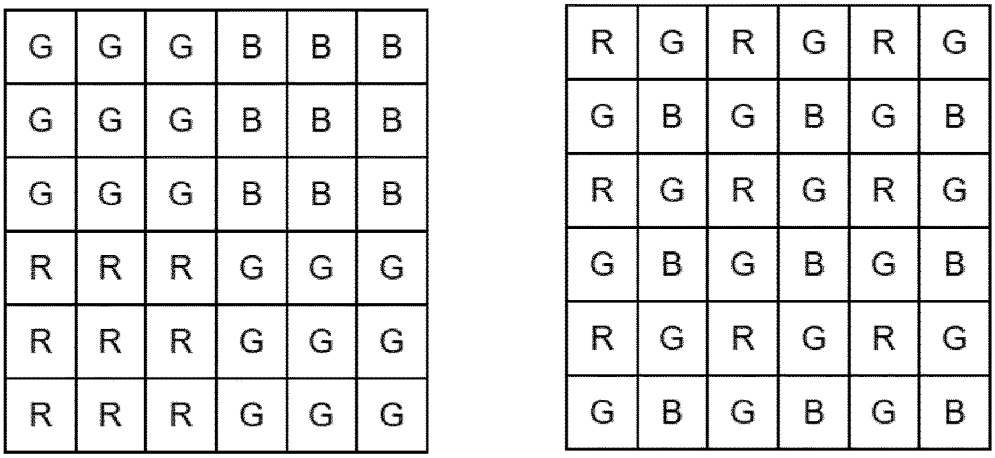
As illustrated in FIG. 10C, both of these patterns may be represented as 6×6 arrays at the sensor pixel level.

One challenge with the use of nona-pixel sensor is the variability of the spatial resolution of the refocused images. FIGS. 9A and 9B illustrate two potential options for a color filter based on a Bayer pattern. FIG. 9A illustrates a color filter array in which each micro-lens (illustrated schematically as a circle) is associated with one color of a Bayer pattern. FIG. 9B illustrates a color filter array in which each sensor pixel is associated with one color of the Bayer pattern. In either case, the Bayer pattern itself is a 2×2 color pattern that is replicated or mosaiced to cover the full sensor. FIG. 10A illustrates the 2×2 color pattern that is replicated to generate the pattern of FIG. 9A, and FIG. 10B illustrates the 2×2 color pattern that is replicated to generate the pattern of FIG. 9B. As illustrated in FIG. 10C, both of these patterns may be represented as 6×6 arrays at the sensor pixel level.

Figure 11A:
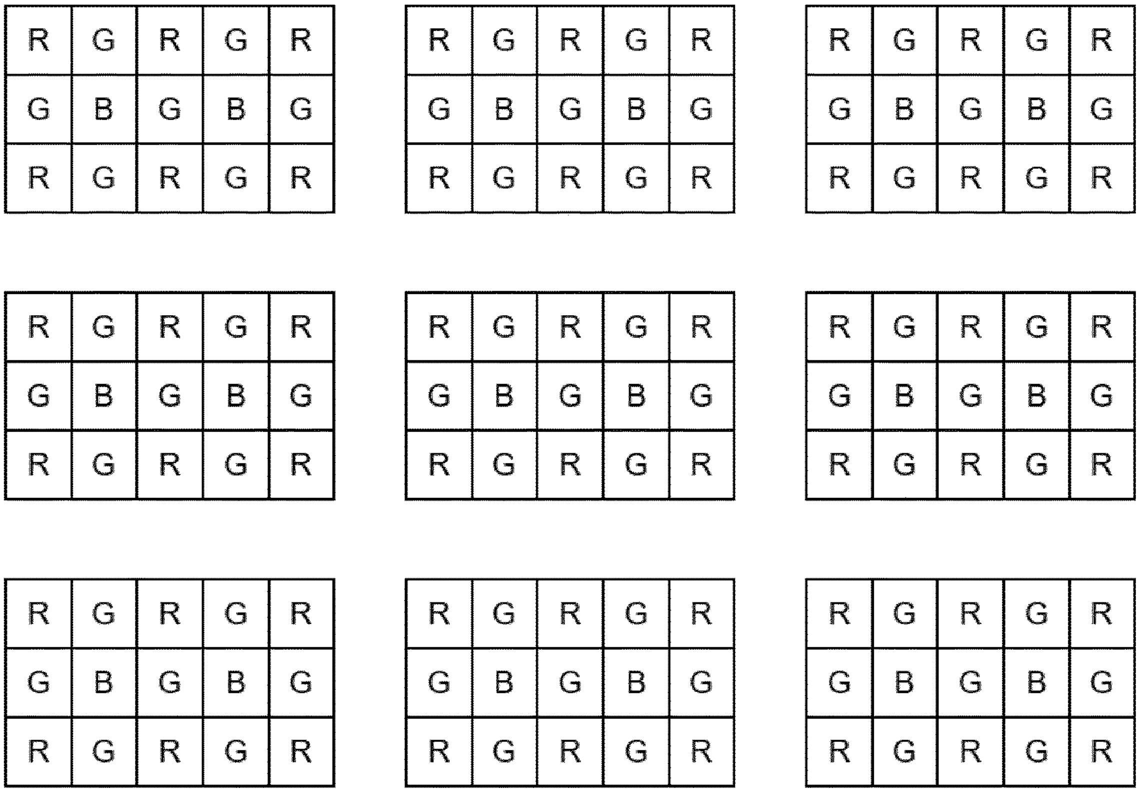
FIG. 11A illustrates the color patterns of the nine sub-aperture images that can be extracted from a sensor with the pattern shown in FIG. 9A.
Figure 11B:
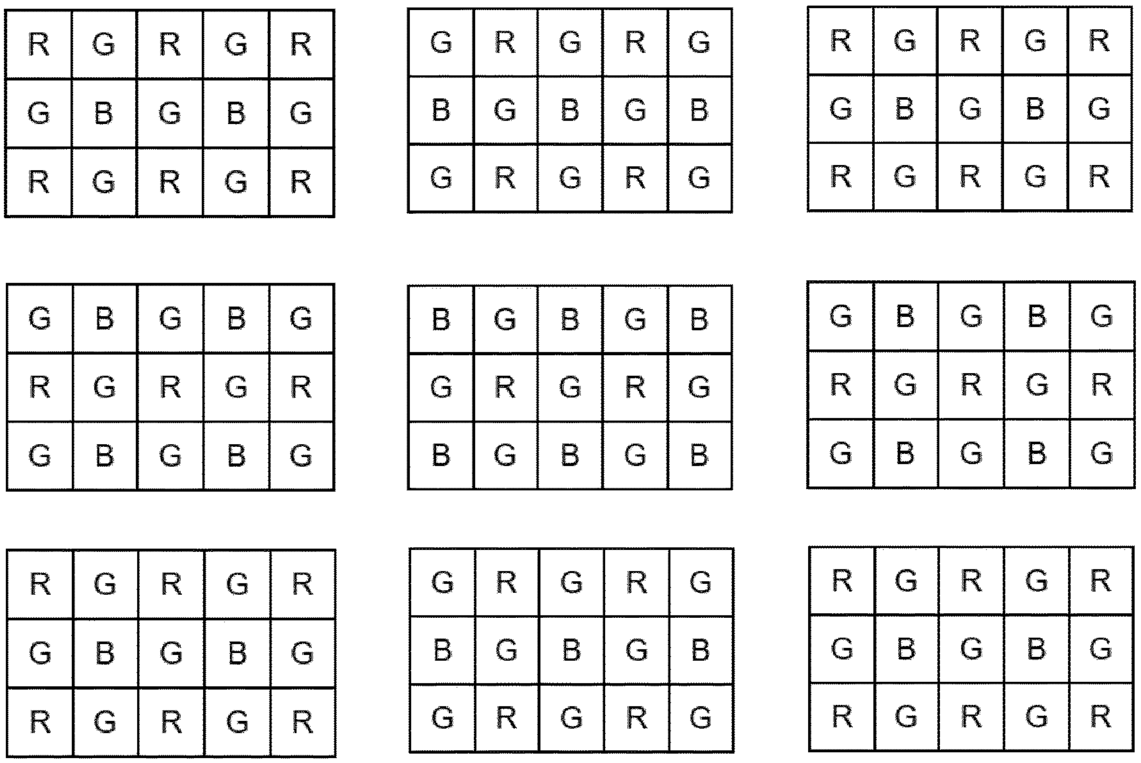
FIG. 11B illustrates the color patterns of the nine sub-aperture images that can be extracted from a sensor with the pattern shown in FIG. 9B.

FIG. 11A illustrates the color patterns of the nine sub-aperture images that can be extracted from a sensor with the pattern shown in FIG. 9A. FIG. 11B illustrates the color patterns of the nine sub-aperture images that can be extracted from a sensor with the pattern shown in FIG. 9B. In the sub-aperture images of FIG. 11A, the sub-aperture images have the same sampled color pattern. In the sub-aperture images of FIG. 11B, however, the sampled color pattern varies between sub-aperture images.

As described above in greater detail, refocused images can be obtained by summing the sub-aperture images with a shift that depends on the selected focalization distance. However, for the color patterns in the sensors of FIGS. 9A and 9B, the color patterns of the resulting refocused images can change for different focalization distances.

For example, the sensor of FIG. 9A, when refocused using a shift of 0 or 2 modulo 3, gives a color pattern as represented schematically in FIG. 12A once the nine sub-aperture images are added together (ignoring, for illustration purposes, any subsequent normalization). However, when the same nine sub-aperture images are added with a shift of 1 modulo 3, the result is a color pattern as represented schematically in FIG. 12B. Looking for example at the top-left pixel of the two refocused images, the top-left pixel in FIG. 12A would appear red, while the top-left pixel of FIG. 12B would appear as a pale yellow.

Conversely, the sensor of FIG. 9B, when refocused using a shift of 0 or 2 modulo 3, gives a color pattern as represented schematically in FIG. 12B once the nine sub-aperture images are added together, but when the same nine sub-aperture images are added with a shift of 1 modulo 3, the result is a color pattern as represented schematically in FIG. 12A.

Thus, as seen with respect to the color filter patterns of FIGS. 9A and 9B, the color pattern of refocused images varies depending on the amount of shift between the sub-aperture images and the type of Bayer pattern. FIGS. 12A-12B illustrate the two possible color patterns of the refocused image if no demosaicing is performed at the sub-aperture level. All refocused pixels receive the contribution of 3×3=9 sub-aperture pixels, but the ratio between red, green, and blue is not well balanced. The ratio depends on the color filter array and on the sub-aperture shifts. Example embodiments address the issue of refocused images that do not receive a well balanced number of colors per refocused pixel.

Balancing Colors of Refocused Images.

Example embodiments include color filter arrays with a repeating pattern of 6×6 pixels. Examples of such color filter arrays may be used with a nona-pixel plenoptic sensor. Example embodiments may improve the balance of red green and blue pixels (or pixels using other color primaries) in refocused images generated from sub-aperture images.

Some embodiments select color patterns by considering focalization distances that correspond to integer shifts between the sub-aperture images. Since one is focusing only on the color pattern of the refocused images, one is considering only the integer values of p mod 3 (where mod designate the mathematical modulo). Refocused images having the same p mod 3 may share the same color patterns.

Refocus pixels receive the contribution of 3×3=9 sub-aperture pixels. It is desirable for each refocus pixel to receive a well-balanced color from the nine sub-aperture images. One way to achieve such a well-balanced color is for all refocused pixels to receive contributions from three red, three green, and three blue sub-aperture pixels.

Extended Bayer Patterns.

Figure 13:
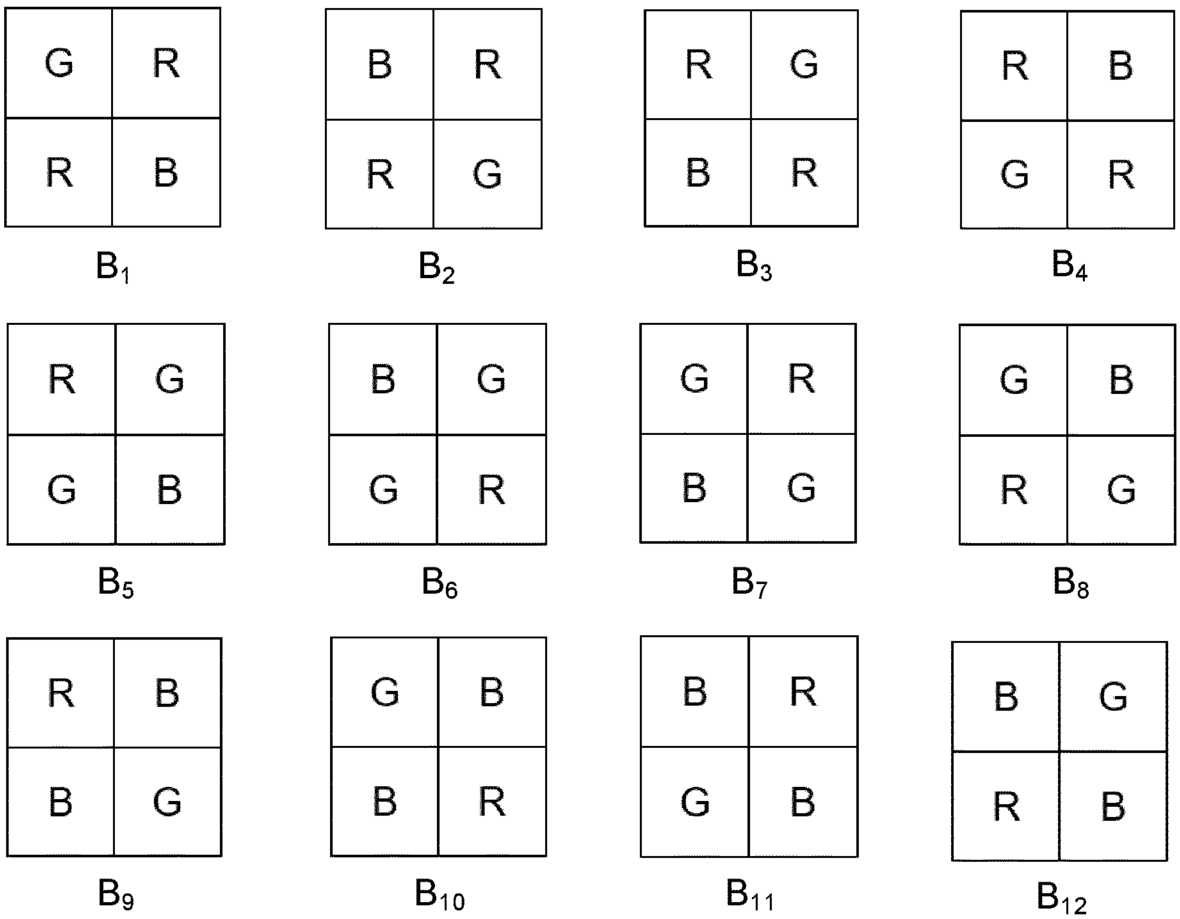
FIG. 13 illustrates the twelve possible extended Bayer patterns.

In some embodiments, the color patterns of a color filter array are selected such that each of the sub-aperture images has a color pattern referred to herein as an extended Bayer pattern. An extended Bayer pattern is a pattern based on a repeating 2×2 array of three color primaries (e.g. red, green, and blue) in which two pixels that are vertically or horizontally adjacent have different colors. There are twelve such patterns, all of which are illustrated in FIG. 13. The twelve patterns are labeled $B_1$ through $B_{12}$. Patterns $B_1$ through $B_4$ have two red pixels. Patterns $B_5$ through $B_8$ have two green pixels. Patterns $B_9$ through $B_{12}$ have two blue pixels.

In some embodiments, the color pattern of a color filter array for a nona-pixel plenoptic sensor is selected such that each of the nine sub-aperture images has an extended Bayer pattern. In the conventional Bayer pattern, the pattern is made of 2×2 color filters selected from red, green, and blue; since this pattern has four filters, the green filter is duplicated in diagonal. The conventional Bayer patterns have 4 variations as illustrated in patterns $B_5$ through $B_8$ of FIG. 13. The variations correspond to the possible choice of the two green pixels and the red and blue pixels.

The extended Bayer patterns include color permutations such that the two similar colors of the Bayer patterns could be red, green or blue, resulting in the patterns of FIG. 13.

In some embodiments, the color pattern of a color filter array for a nona-pixel plenoptic sensor is selected such that three of the sub-aperture images use an extended Bayer pattern with two red pixels (any one of patterns $B_1$ through $B_4$), three of the sub-aperture images use an extended Bayer pattern with two green pixels (any one of patterns $B_5$ through $B_8$), and three of the sub-aperture images use an extended Bayer pattern with two blue pixels (any one of patterns $B_9$ through $B_{12}$). Selecting a color filter pattern this way allows for pixels from refocused images to receive the contribution of three red, three green, and three blue pixels from the nine sub-aperture pixels.

Color Balance for Integer Disparity.

In example embodiments, the color pattern of a color filter array for a nona-pixel plenoptic sensor is selected such that each of the pixels from a refocused image receives the contribution of three red, three green, and three blue pixels from the nine sub-aperture images whenever p=0, 1, 2 mod 3.

One way to identify color patterns that satisfy this property is to test sub-aperture images having various combinations of extended Bayer patterns to identify combinations that satisfy this property. This may readily be done using computational techniques.

One technique for identifying one or more desirable color patterns may be performed computationally as follows. Let B the collection of the twelve extended Bayer patterns $B_b$ enumerated from b=1 to 12 and illustrated in FIG. 13. A pattern $B_b$ (x,y) is defined by a 2×2 pixel array, with each pixel being identified by $(x,y)\in[0,1]^2$, with $0\le x\le 1$ and $0\le y\le 1$. The content of a pixel is the filter which is characterized with an RGB triplet. For instance, $B_4(1,0)$ {0,0,1} describes the pixel (0,1) of the extended Bayer pattern number 4. The RGB triplet {0,0,1} indicates that the associated color is blue.

| Pattern ID | Pixel (0, 0) | Pixel (1, 0) | Pixel (0, 1) | Pixel (1, 1) |
|---|---|---|---|---|
| $B_1$ | $B_1$(0, 0) = {0, 1, 0} | $B_1$(1, 0) = {1, 0, 0} | $B_1$(0, 1) = {1, 0, 0} | $B_1$(1, 1) = {0, 0, 1} |
| $B_2$ | $B_2$(0, 0) = {0, 0, 1} | $B_2$(1, 0) = {1, 0, 0} | $B_2$(0, 1) = {1, 0, 0} | $B_2$(1, 1) = {0, 1, 0} |
| $B_3$ | $B_3$(0, 0) = {1, 0, 0} | $B_3$(1, 0) = {0, 1, 0} | $B_3$(0, 1) = {0, 0, 1} | $B_3$(1, 1) = {1, 0, 0} |
| $B_4$ | $B_4$(0, 0) = {1, 0, 0} | $B_4$(1, 0) = {0, 0, 1} | $B_4$(0, 1) = {0, 1, 0} | $B_4$(1, 1) = {1, 0, 0} |
| $B_5$ | $B_5$(0, 0) = {1, 0, 0} | $B_5$(1, 0) = {0, 1, 0} | $B_5$(0, 1) = {0, 1, 0} | $B_5$(1, 1) = {0, 0, 1} |
| $B_6$ | $B_6$(0, 0) = {0, 0, 1} | $B_6$(1, 0) = {0, 1, 0} | $B_6$(0, 1) = {0, 1, 0} | $B_6$(1, 1) = {1, 0, 0} |
| $B_7$ | $B_7$(0, 0) = {0, 1, 0} | $B_7$(1, 0) = {1, 0, 0} | $B_7$(0, 1) = {0, 0, 1} | $B_7$(1, 1) = {0, 1, 0} |
| $B_8$ | $B_8$(0, 0) = {0, 1, 0} | $B_8$(1, 0) = {0, 0, 1} | $B_8$(0, 1) = {1, 0, 0} | $B_8$(1, 1) = {0, 1, 0} |
| $B_9$ | $B_9$(0, 0) = {1, 0, 0} | $B_9$(1, 0) = {0, 0, 1} | $B_9$(0, 1) = {0, 0, 1} | $B_9$(1, 1) = {0, 1, 0} |
| $B_{10}$ | $B_{10}$(0, 0) = {0, 1, 0} | $B_{10}$(1, 0) = {0, 0, 1} | $B_{10}$(0, 1) = {0, 0, 1} | $B_{10}$(1, 1) = {1, 0, 0} |
| $B_{11}$ | $B_{11}$(0, 0) = {0, 0, 1} | $B_{11}$(1, 0) = {1, 0, 0} | $B_{11}$(0, 1) = {0, 1, 0} | $B_{11}$(1, 1) = {0, 0, 1} |
| $B_{12}$ | $B_{12}$(0, 0) = {0, 0, 1} | $B_{12}$(1, 0) = {0, 1, 0} | $B_{12}$(0, 1) = {1, 0, 0} | $B_{12}$(1, 1) = {0, 0, 1} |

Let $B_{i,j}$ be the extended Bayer pattern selected for the sub-aperture image $S_{i,j}$ with $0\le i<3$ and $0\le j<3$. The refocused image $R_\rho$ is the sum of the nine sub-aperture images which are shifted by (ρi, ρj) before the summing to select a given focalization distance. The RGB triplet received by accumulating the nine translated sub-aperture images.

$$R_\rho(x, y) = \sum_{i=0}^{i<3}\sum_{j=0}^{j<3} B_{i,j}((x+\rho i) \bmod 2, (y+\rho j) \bmod 2)$$

In the previous equation, sums are performed from the RGB triplet from the sub-aperture image.

A resulting triplet at a given pixel of the refocused image receives nine contributions from the nine sub-aperture images. These contributions are added. It is desirable for the accumulated contribution to be equal to {3,3,3} which indicates an equal contribution of the red, green, and blue pixels.

The refocused image is naturally demosaiced and accumulated colors from the sub-aperture images are well balanced if $R_\rho$ (0,0)={3,3,3} and $R_\rho$ (0,1)={3,3,3} and $R_\rho$ (1,0)={3,3,3} and $R_p$ (1,1)={3,3,3}. Since the extended Bayer patterns have a periodicity of two, it is sufficient to check whether the colors are balanced for ρ=0 and for ρ=1. If so, then they will also be balanced for other integer values of ρ.

In one example of a technique for identifying desirable color patterns, a search may be performed among the all of the possible combinations of extended Bayer patterns for the sub-aperture images. Such a search may be conducted using nested "for" loops as in the following pseudocode.

```
For B0,0 in 𝔅
  For B0,1 in 𝔅
    For B0,2 in 𝔅
      For B1,0 in 𝔅
        For B1,1 in 𝔅
          For B1,2 in 𝔅
            For B2,0 in 𝔅
              For B2,1 in 𝔅
                For B2,2 in 𝔅
                  For 0 ≤ s < 3
                    Compute Rs(x,y) with (x,y) ∈ [0,1]^2
                    if Rρ(0,0) = Rρ(0,1) = Rρ(1,0) = Rρ(1,1) =
                    {3,3,3}
                      Keep (B0,0, B0,1, B0,2, B1,0, B1,1, B1,2, B2,0,
                      B2,1, B2,2) as a valid candidate
```

In total there are 129 ways to select the nine extended Bayer patterns for the nine sub-aperture images from the collection of the twelve extended Bayer patterns in 𝔅. A search performed as described above identifies 10368 valid candidates.

Figure 14:
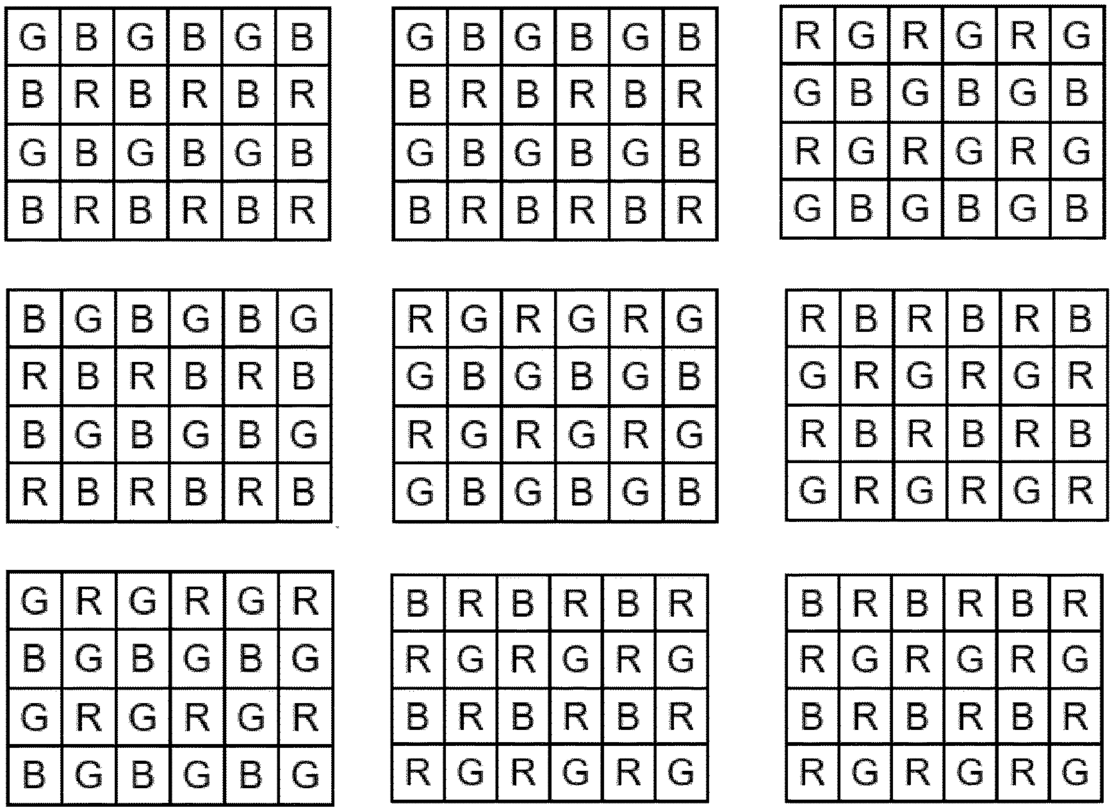
FIG. 14 illustrates an example of nine sub-aperture images in which each of the sub-aperture images has a selected one of the twelve extended Bayer patterns.

FIG. 14 illustrates an example of nine sub-aperture images found using the technique above, with each of the sub-aperture images having a selected one of the twelve extended Bayer patterns. This example uses an extended Bayer pattern on each of the nine sub-aperture images. The example enables refocused images $R_\rho$ to receive the same contribution of red, green, and blue pixels from the nine sub-aperture images, for any integer disparity ρ.

Figure 15:
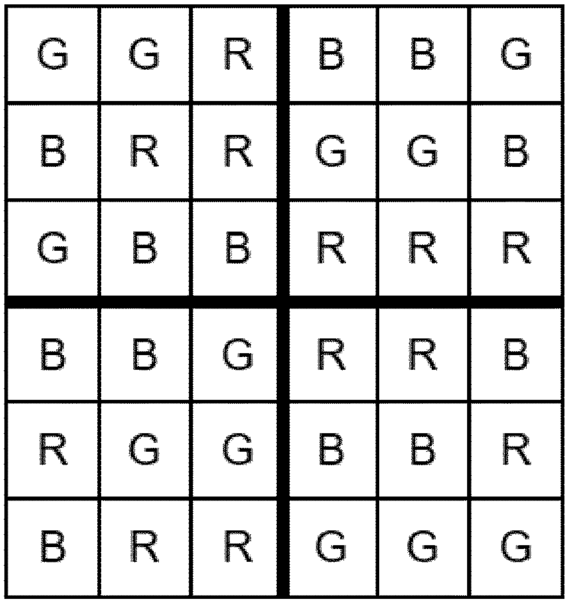
FIG. 15 illustrates a 6×6 color filter array pattern according to one embodiment. The pattern of FIG. 15, when repeated over the sensor array, results in the sub-aperture images shown in FIG. 14.

FIG. 15 illustrates the color filter array pattern at the level of the plenoptic sensor that, when repeated over the sensor array, results in the sub-aperture images shown in FIG. 14. Each 3×3 quadrant of the pattern may be arranged under one corresponding micro-lens.

The pattern of 6×6 pixels may be determined by interleaving the nine extended Bayer patterns from the selected candidate shown in FIG. 14.

Figure 16:
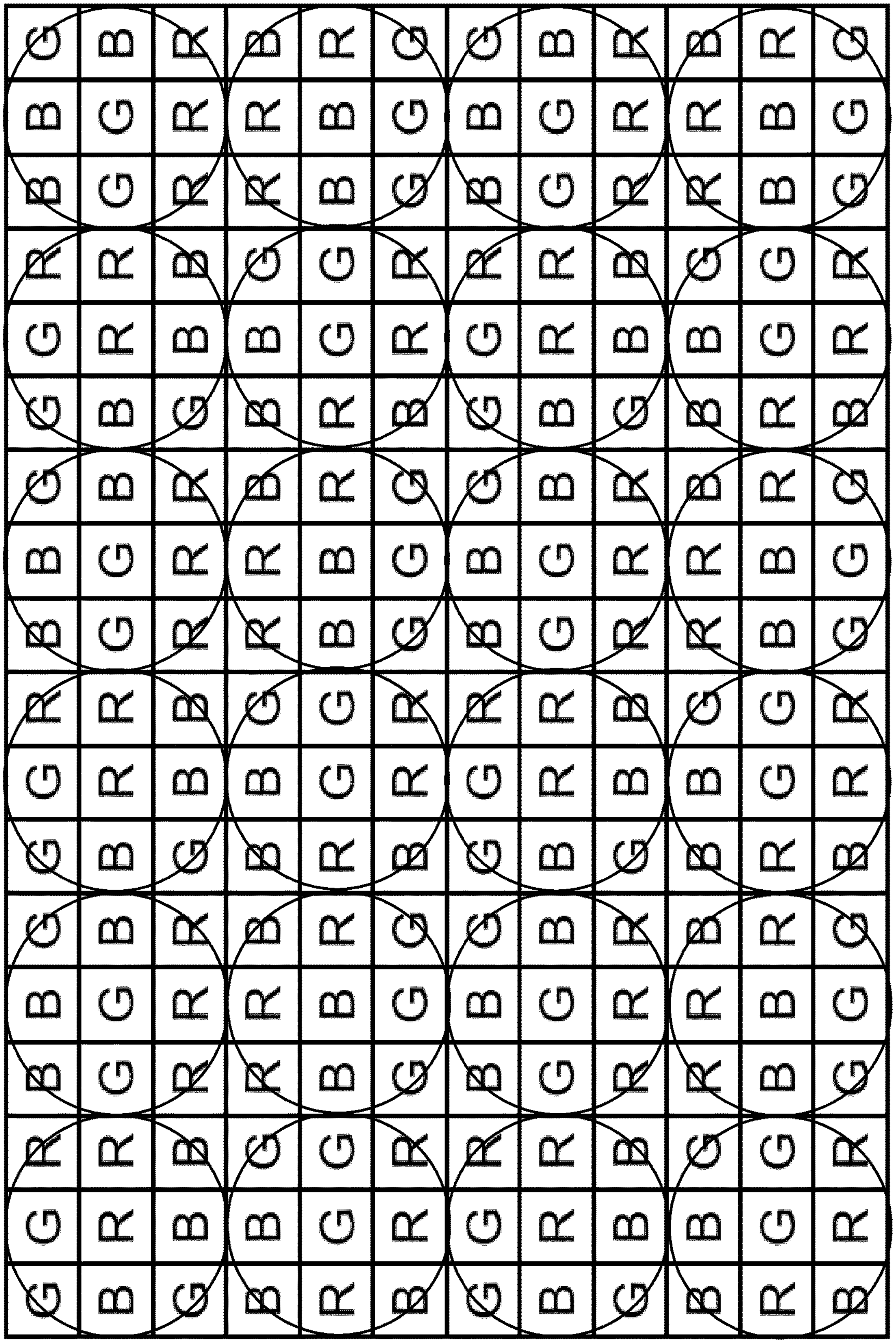
FIG. 16 schematically illustrates a nona-pixel plenoptic sensor, according to an embodiment, using a color filter with the repeated 6×6 pattern of FIG. 15.

FIG. 16 schematically illustrates a nona-pixel plenoptic sensor using a color filter with the repeated 6×6 pattern of FIG. 15. Each micro-lens is schematically illustrated as a circle covering its associated set of nine pixels. Although the sensor illustrated schematically in FIG. 16 has a small array of 24×12 sensor pixels for purposes of illustration, it should be understood that example embodiments also include much larger arrays with hundreds or thousands of sensor pixels along each side.

Characterizing Color Patterns of Example Embodiments

Each of the pixels within a 6×6 pattern can be identified by integer coordinates (m,n) with $0\le m\le 5$ and $0\le n\le 5$. The pixel coordinates of an example 6×6 pattern are shown in FIG. 17, where m represents the column number and n represents the row number (although the row and column numbers can be switched without departing from the principles described herein). Example embodiments may be described in terms of the color at position (m,n). In a plenoptic sensor with pixel positions indicated by coordinates (x,y), the color associated with an arbitrary pixel may be determined by taking m=(x mod 6) and n=(y mod 6) and finding the color at position (m,n).

The embodiments described herein are not restricted to the use of red, green, and blue as color primaries. For that reason, the color primaries may be referred to as a first, a second, and a third different color. As an example, the color primaries may be cyan, magenta, and yellow. FIG. 18 illustrates nine sub-aperture images generated from the color filter array pattern of FIG. 17. (While each of the sub-aperture images is shown for illustrative purposes as being a 6×6 image, the sub-aperture images in commercial embodiments may be much larger, on the order of hundreds or even thousands of pixels in each dimension.)

A sub-aperture image is one of the twelve extended Bayer arrays if it is a repeating 2×2 pattern of three colors, and if pixels that are adjacent either vertically or horizontally have different colors. With reference to FIGS. 17 and 18, this translates into the conditions that any two pixels (m,n) and ((m+3) mod 6, n) have different colors and that any two pixels (m,n) and (m, (n+3) mod 6) have different colors. A three-color 6×6 array that satisfies these two conditions will give sub-aperture images that have extended Bayer patterns. Phrased differently, the sub-aperture images all have extended Bayer patterns if each filter pixel (m,n), with m≤2 has a different color than filter pixel (m+3, n) and each filter pixel (m,n), with n≤2 has a different color than filter pixel (m, n+3).

As another example, 6×6 patterns as described herein for use in nona-pixel plenoptic sensors have been found to satisfy the following properties.

The condition that colors are balanced when the nine sub-aperture images are added with zero disparity implies that, among the nine pixels (0,0), (1,0), (2,0), (0,1), (1,1), (2,1), (0,2), (1,2), (2,2), namely the pixels at the top-left of each sub-aperture image, there are three pixels of the first color, three pixels of the second color, and three pixels of the third color (for example, three red, three green, and three blue pixels.) Applying the same condition to other pixels added with zero disparity, it is observed that, within each 3×3 quadrant of the color filter array pattern, there are three pixels of the first color, three pixels of the second color, and three pixels of the third color. Phrased differently, within each of the following four groups of nine pixels, there are three pixels of the first color, three pixels of the second color, and three pixels of the third color:

- the nine pixels with both m=0, 1, or 2 and n=0, 1, or 2 (the top-left quadrant);
- the nine pixels with both m=3, 4, or 5 and n=0, 1, or 2 (the top-right quadrant);
- the nine pixels with both m=0, 1, or 2 and n=3, 4, or 5 (the bottom-left quadrant); and
- the nine pixels with both m=3, 4, or 5 and n=3, 4, or 5 (the bottom-right quadrant).

These conditions may be referred to for convenience as conditions that the colors are balanced within the nine pixels of each quadrant of the color pattern.

Figure 20A:
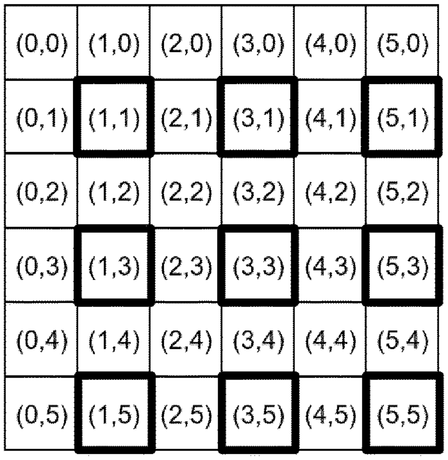
FIGS. 20A-20D illustrate a 6×6 color filter array pattern, with each of the four figures highlighting a different set of nine color-balanced pixels.
Figure 20B:
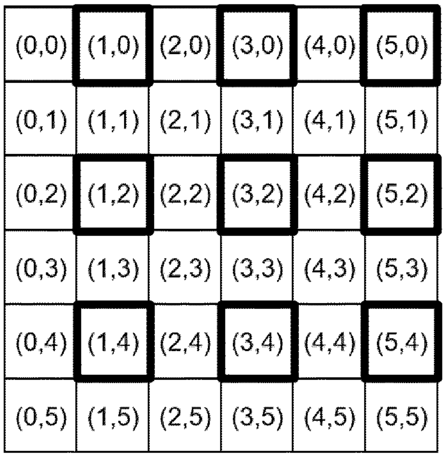
Figure 20C:
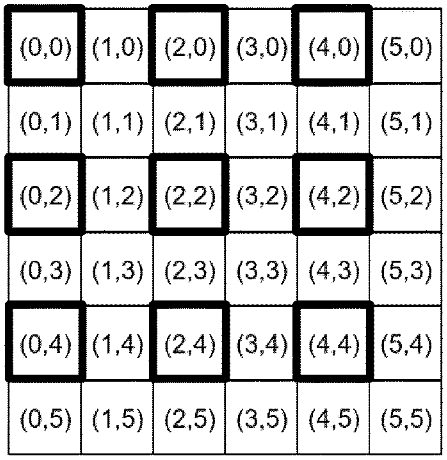
Figure 20D:
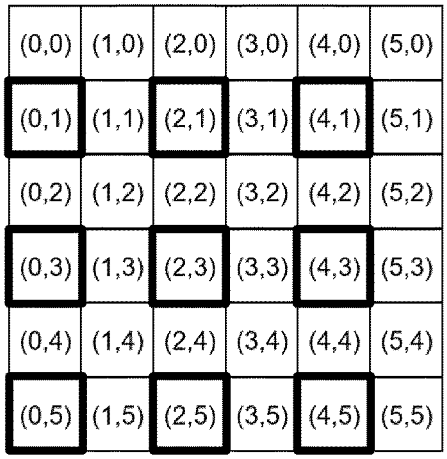

The condition that colors are balanced when the nine sub-aperture images are added with disparity of one is illustrated schematically in FIG. 19. FIG. 19 shows the same sub-aperture images as FIG. 18, with dark boxes added to highlight one of the sets of nine pixels that are added together during refocusing. The color balancing condition implies that, among those nine pixels (1,1), (3,1), (5,1), (1,3), (3,3), (5,3), (1,5), (3,5), (5,5), there are three pixels of the first color, three pixels of the second color, and three pixels of the third color. Those pixels are highlighted with dark boxes in the 6×6 color filter array pattern of FIG. 20A. Applying the same condition to other pixels in the sub-aperture images, other sets of nine pixels may be identified that have three pixels of the first color, three pixels of the second color, and three pixels of the third color. These other sets of pixels are illustrated in FIGS. 20B-20D. Put differently, within each of the following four groups of nine pixels, there are three pixels of the first color, three pixels of the second color, and three pixels of the third color:

- the nine pixels with both m=1, 3, or 5 and n=1, 3, or 5 (FIG. 20A);
- the nine pixels with both m=1, 3, or 5 and n=0, 2, or 4 (FIG. 20B);
- the nine pixels with both m=0, 2, or 4 and n=0, 2, or 4 (FIG. 20C); and
- the nine pixels with both m=0, 2, or 4 and n=1, 3, or 5 (FIG. 20D).

These conditions may be referred to for convenience as conditions that the colors are balanced within each double-spaced square of nine pixels of the color pattern.

Because the color patterns of the sub-aperture images repeat every two pixels, any integer disparity greater than one replicates the above conditions.

The combination of the foregoing conditions (colors are balanced within the nine pixels of each quadrant, and colors are balanced within each double-spaced square) may be expressed in different terms as follows. In an example embodiment, a color filter system comprises a repeated 6×6 pattern of filter pixels, arranged as follows,

| | | | | | |
|---|---|---|---|---|---|
| a, g | a, f | a, g | b, f | b, g | b, f |
| a, h | a, e | a, h | b, e | b, h | b, e |
| a, g | a, f | a, g | b, f | b, g | b, f |
| c, h | c, e | c, h | d, e | d, h | d, e |
| c, g | c, f | c, g | d, f | d, g | d, f |
| c, h | c, e | c, h | d, e | d, h | d, e |

with each filter pixel having either a first, a second, or a third color. A separate letter ("a" through "h") labels each of the (partly overlapping) groups of nine filter pixels. Within each of those groups of nine pixels labeled with a common letter, three have the first color, three have the second color, and three have the third color.

Color Patterns with Reduced Diffraction and/or Reduced Manufacturing Cost.

In some embodiments, a color pattern for a color filter array for a nona-pixel plenoptic sensor is selected based on conditions in addition to the conditions given above.

When considering really small pixels (e.g. <2 μm), placing multiple color filters under one single micro-lens can be difficult due to manufacturing constraints (resin deposition and mask complexity). Moreover, the diffraction of light by the micro-lens and along the edges of the different filters is likely to cause color cross talk hence making color reconstruction harder.

In some embodiments, a color filter array has a color pattern that satisfies constraints imposed to reduce diffraction and/or manufacturing costs. For example, the color pattern may be selected to reduce (or minimize, in some embodiments) or to increase (or maximize, in some embodiments) a particular metric.

In some embodiments, a metric is be applied on the 6×6 pattern. In other embodiments, a metric is applied to each 3×3 portion of the pattern under a micro-lens, giving four sub-scores. In the latter case, a global score may be determined as the sum or the average of the four sub-scores. The metric may also be determined for every color in the pattern, giving for example a green score, a red score and a blue score that are summed to give a global score. One example of a metric is the number of edges of each color. Another example of a metric is the number of clusters of each color.

Figure 21A:
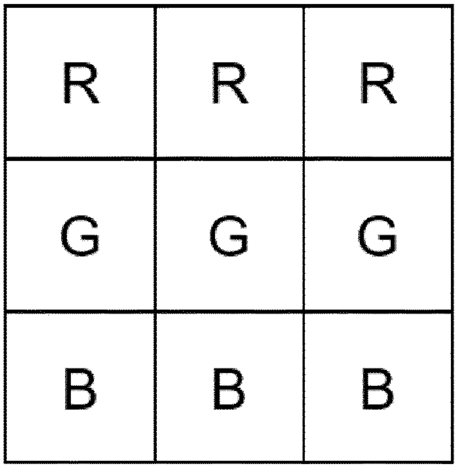
FIGS. 21A and 21B illustrate examples of 3×3 color patterns for which edge scores can be calculated.
Figure 21B:
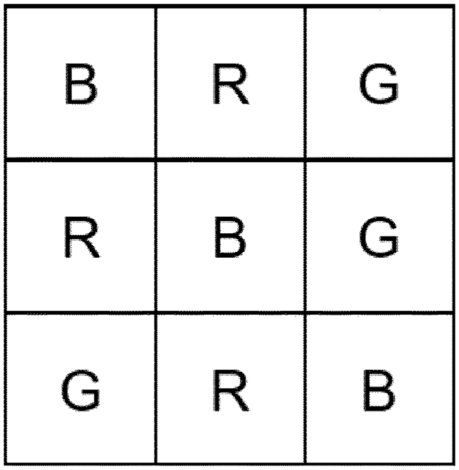

One example of a metric is the number of edges per pixel. Another example of a metric is the number of edges per color. With reference to FIG. 21A, in the illustrated 3×3 color pattern, the perimeter of the area covered by each color is 8 (in units of pixel edge size), giving each color an edge score of 8 and resulting in a global score of 24. With reference to FIG. 21B, the red and the blue areas each have a total perimeter of 12 and the green areas each have a total perimeter of 10, giving a global score of 34. In this example, the pattern of FIG. 21A is likely to be better in terms of manufacturing and color cross talk in the horizontal axis than the pattern of FIG. 21B.

To determine the number of edges per color and per pixel, one technique is to convolve the patterns by the following kernels: kx=[−1; 1] and ky=[−1; 1]$^T$ where T denotes the matrix transposition. That produces a x-edges map and a y-edges map Then the global score is:

$$S = \text{abs}(x\text{−edges}_{red}) + \text{abs}(y\text{−edges}_{red}) + \text{abs}(x\text{−edges}_{green}) + \text{abs}(y - \text{edges\_green}) + \text{abs}(x - \text{edges\_blue}) + \text{abs}(y - \text{edges\_blue})$$

where abs( ) denotes the absolute value.

Figure 22A:
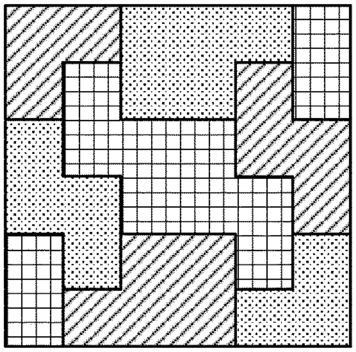
FIGS. 22A-22X illustrate 6×6 color filter array patterns according to example embodiments.
Figure 22B:
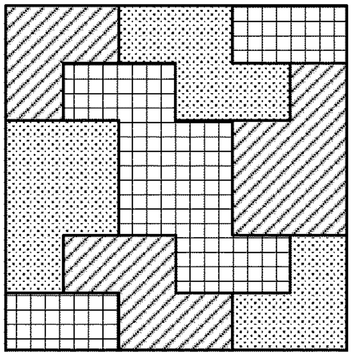
Figure 22C:
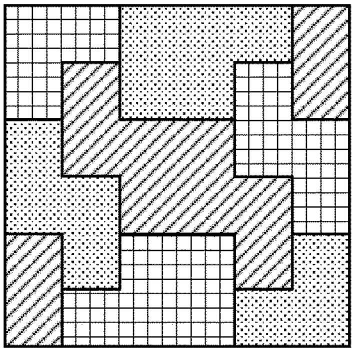
Figure 22D:
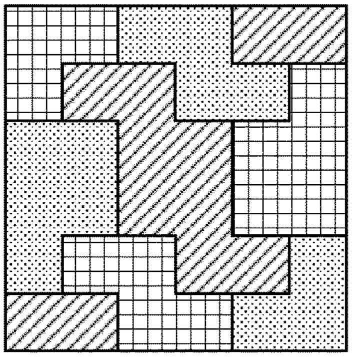
Figure 22E:
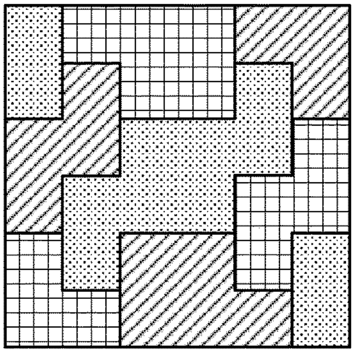
Figure 22F:
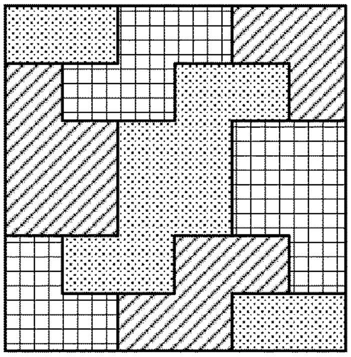
Figure 22G:
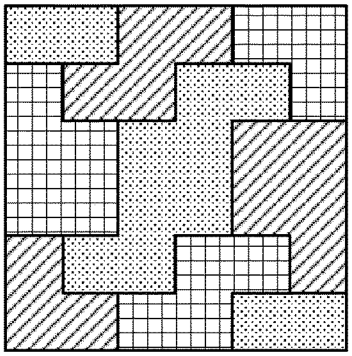
Figure 22H:
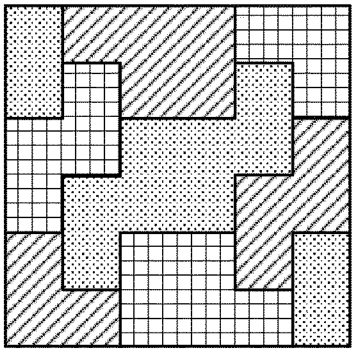
Figure 22I:
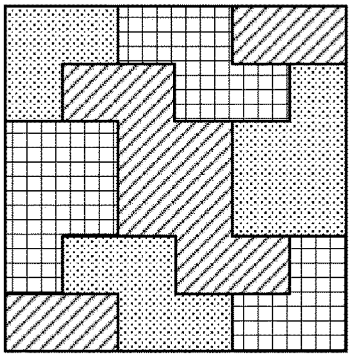
Figure 22J:
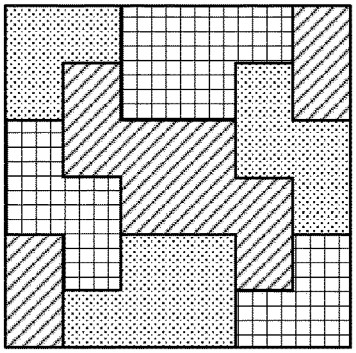
Figure 22K:
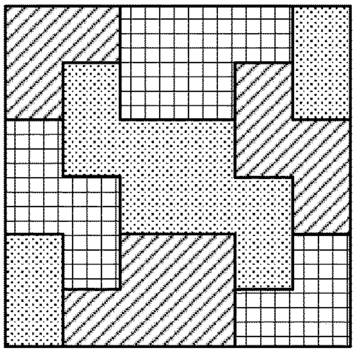
Figure 22L:
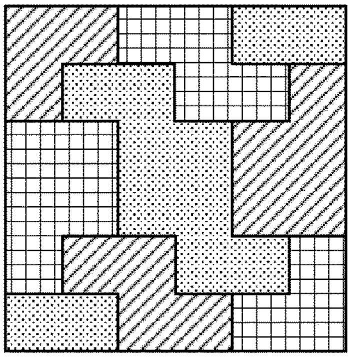
Figure 22M:
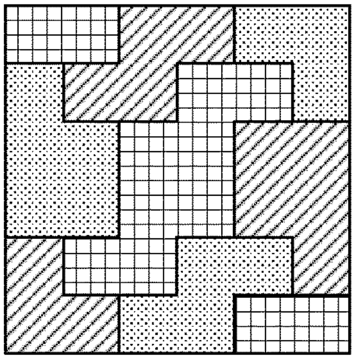
Figure 22N:
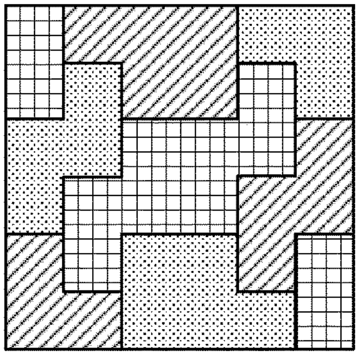
Figure 22O:
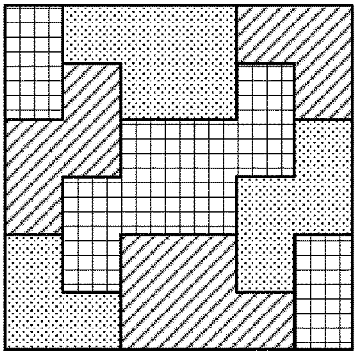
Figure 22P:
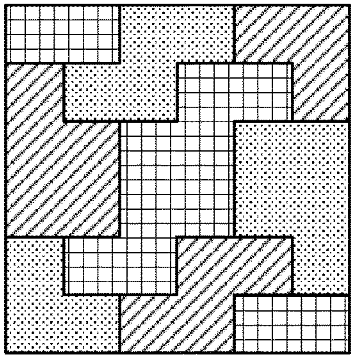
Figure 22Q:
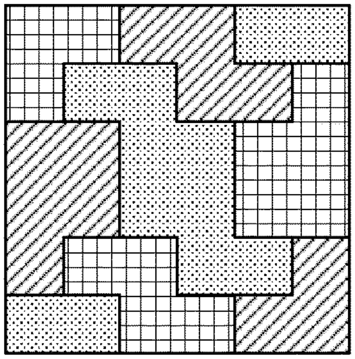
Figure 22R:
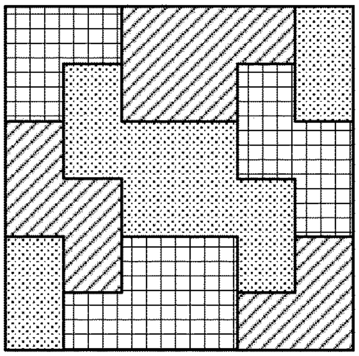
Figure 22S:
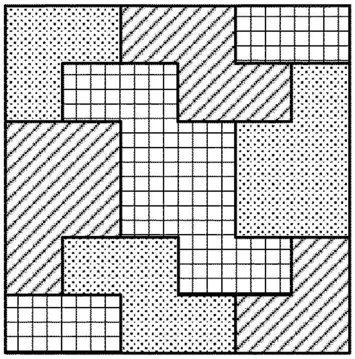
Figure 22T:
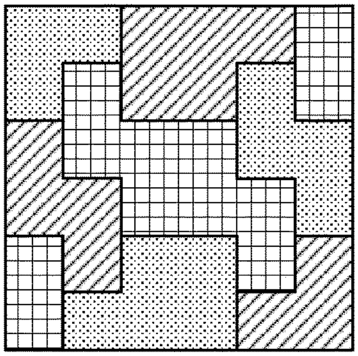
Figure 22U:
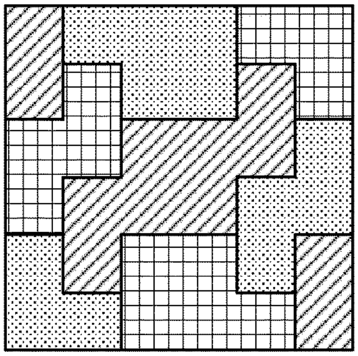
Figure 22V:
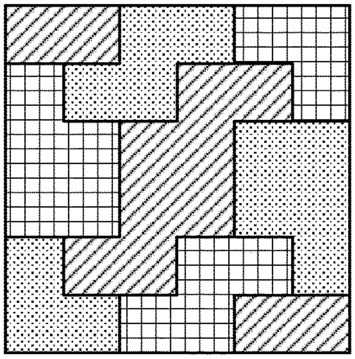
Figure 22W:
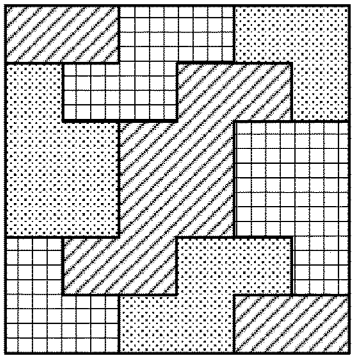
Figure 22X:
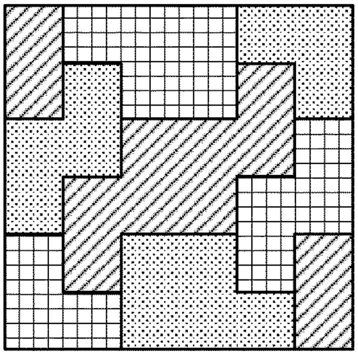

A similar analysis is applied in some embodiments to the 6×6 patterns that satisfy the color balancing conditions described above. By using the number of edges of each color (R,G,B), we can extract a subset of solutions which may be less complex to manufacture and may result in less diffractive cross-talk. Some example embodiments that provide for balanced colors during refocusing and a relatively low number of edges are illustrated in FIGS. 22A-22X. In these figures, diagonal hatching represents red, dotted hatching represents green, and square grid hatching represents blue. In the embodiments of FIGS. 22A-22X, the number of edges for each color is 28, giving a total of 84 edges (calculated in this manner) within a 6×6 pattern. It is desirable in some embodiments for the total number of edges within a 6×6 pattern to be no greater than 84 (regardless of whether the pattern is one of those shown in FIGS. 22A-22X).

As noted above, some embodiments are selected according to a metric in which the number of edges is determined separately for each 3×3 quadrant, and the four resulting numbers are summed for the entire 6×6 pattern. A 6×6 pattern that minimizes that metric may then be selected. Examples of embodiments with a relatively low number of edges according to this metric include the 6×6 patterns illustrated in FIGS. 22A-22X together with any other pattern generated by performing one or both of the following transformations on any one of the patterns of FIGS. 22A-22X: swapping the top and bottom halves of the pattern and/or swapping the left and right halves of the pattern. In such patterns, there are 26 edges in each quadrant, giving a total metric of 104 for the 6×6 pattern.

Further examples of embodiments with relatively low numbers of edges according to this metric include the following pattern, where a "1" indicates the first color, a "2" indicates the second color, and a "3" indicates the third color:

| | | | | | |
|---|---|---|---|---|---|
| 1 | 1 | 2 | 2 | 2 | 3 |
| 1 | 2 | 2 | 3 | 3 | 1 |
| 3 | 3 | 3 | 2 | 1 | 1 |

-continued

| | | | | | |
|---|---|---|---|---|---|
| 2 | 2 | 3 | 3 | 3 | 1 |
| 2 | 3 | 3 | 1 | 1 | 2 |
| 1 | 1 | 1 | 3 | 2 | 2 |

Figure 28:
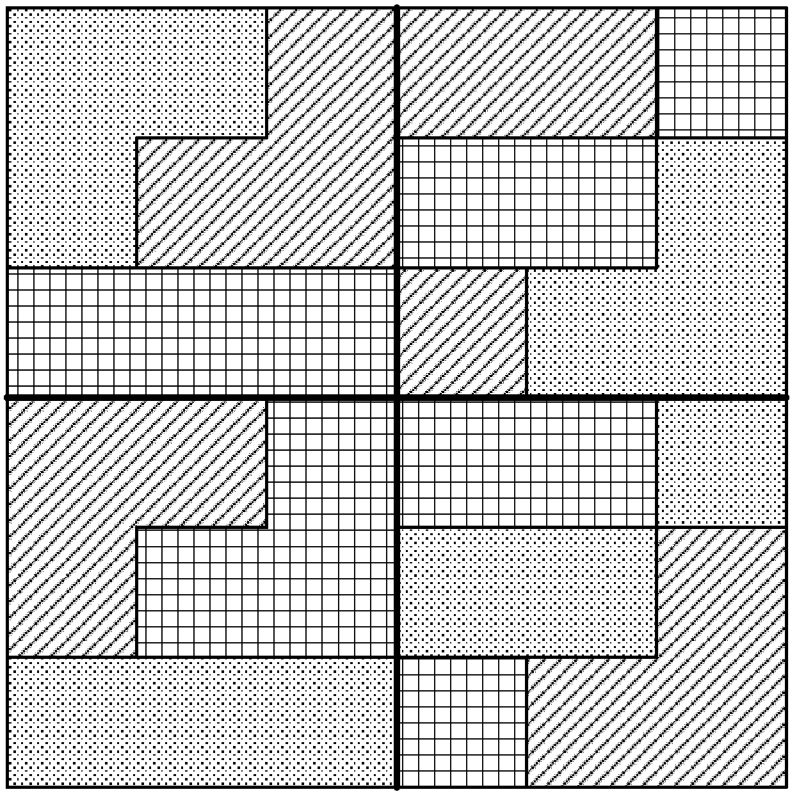
FIG. 28 illustrates another 6×6 color filter array pattern according to example embodiments.

An example of such a pattern is illustrated in FIG. 28. The two left-hand quadrants each have 24 edges and the two right-hand quadrants each have 28 edges, giving once again a total metric of 104 for the 6×6 pattern. In addition to the pattern of FIG. 28, further embodiments with the same metric include any pattern generated by obtaining one or more of the following transformations on the pattern of FIG. 28: swapping the top and bottom halves of the pattern, swapping the left and right halves of the pattern, permuting the three colors, mirroring the pattern, or rotating the pattern.

Deriving Additional Color Patterns.

For any of the color patterns described herein as an embodiment, additional embodiments may be generated using one or more techniques described here. One such technique is to replace the three color primaries used in a particular embodiment (e.g. red, green, and blue) with a different set of color primaries (e.g. cyan, magenta, and yellow). Another technique is to permute the colors within a color pattern (e.g. replacing red with green, green with blue, and blue with red) or to swap any two of those colors (e.g. red for blue, and vice-versa). Another technique for generating additional embodiments is to modify a 6×6 pattern by applying a horizontal, vertical, or diagonal reflection to the pattern and/or applying a rotation (by 90°, 180°, or 270°) to the pattern. Another technique for generating additional embodiments is to swap the top half and bottom half and/or the left half and right half of the 6×6 pattern. If an original pattern satisfies the conditions of using an extended Bayer pattern for sup-aperture images and of having balanced colors for re-focusing with integer disparity, then a pattern that has been permuted, reflected, rotated, or swapped as described in this paragraph will also satisfy those conditions.

In some embodiments, the condition of providing balanced colors for re-focusing with integer disparity is accomplished without requiring that sub-aperture images use extended Bayer patterns. One way to obtain such embodiments is by starting with an embodiment that does use extended Bayer patterns, such as the embodiments described above, and swapping or permuting colors in ways that do not change the color balancing conditions. One way to generate such additional embodiments is to swap any or all pairs of colors at the sides of each quadrant. A couple of examples of such swaps are shown in FIG. 23. Such swaps do not affect the color balance because they do not move any color to a different group of nine color-balanced pixels (the nine pixels in a quadrant, or the nine pixels in a double-spaced square). Another way to generate additional embodiments is to perform a permutation of any of the colors at the corner of a quadrant. Some examples of such permutations are shown in FIG. 24. FIG. 25 illustrates an example of an embodiment that satisfies the color balancing conditions (within each quadrant and within each double-spaced square) without using extended Bayer patterns for all of the sub-aperture images. Other embodiments, however, use extended Bayer patterns for all of the sub-aperture images and also satisfy the color balancing conditions.

Example Nona-Pixel Plenoptic Camera

Figure 26:
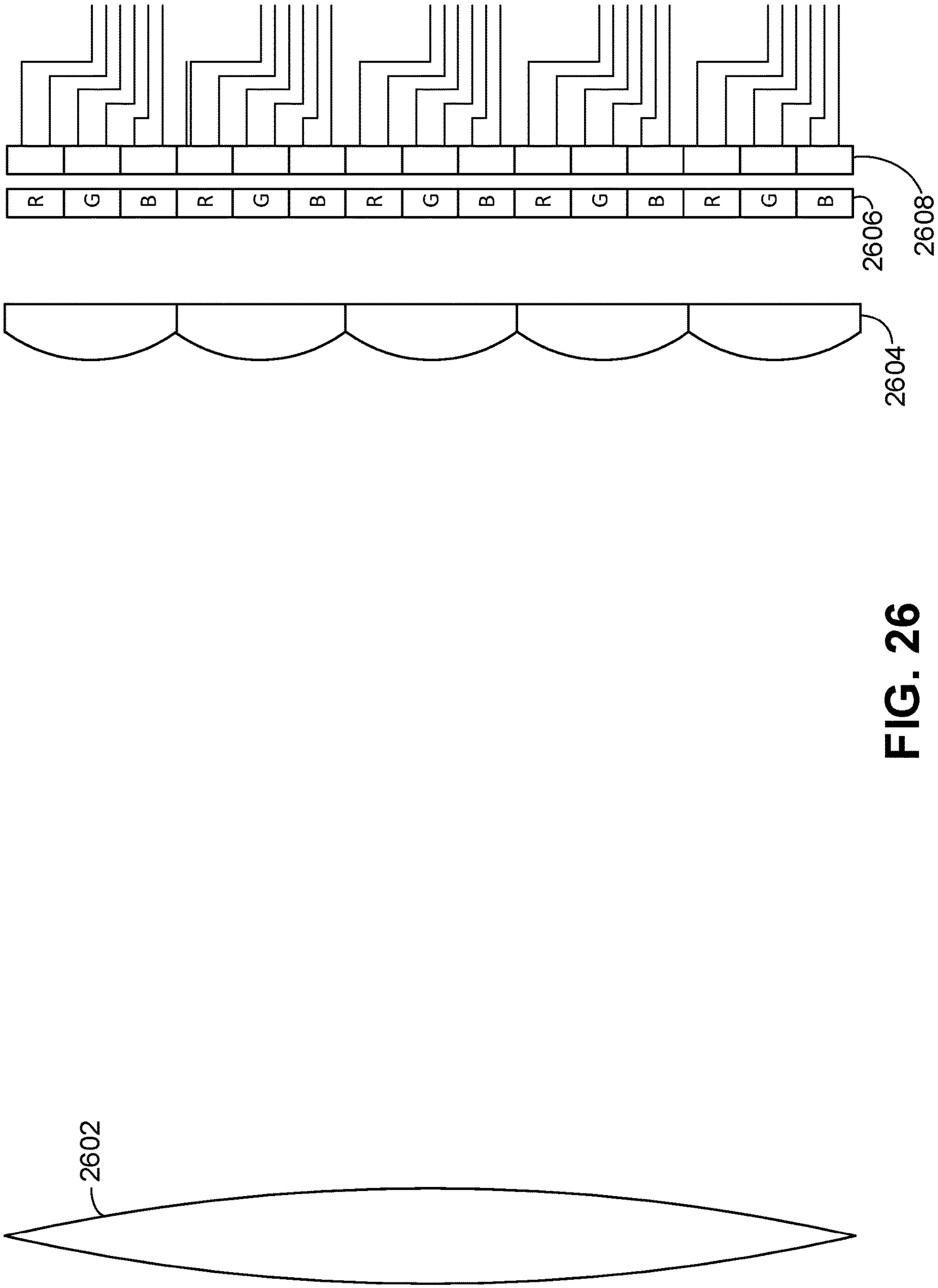
FIG. 26 is a schematic side view of a plenoptic camera using color filter array patterns as described herein.

FIG. 26 is a schematic side view, not to scale, of a plenoptic camera using color filter array patterns as described herein. A main lens 2602 focuses light in front of, behind, or onto (depending on camera parameters and settings an array 2604 of micro-lenses. Each of the micro-lenses in the array covers a 3×3 pattern of filter pixels in a color filter array 2606. Each of the filter pixels covers a respective light sensor pixel in a sensor array 2608. In some embodiments, the different layers 2604, 2606, 2608 may be bonded together or otherwise in contact; in other embodiments, one or more of the layers is spaced apart, either with an air gap or with other components. In some embodiments, different color filter pixels are contiguous with one another; in other embodiments, there may be a gap or other component between the filter pixels. For example, individual color filter pixels may be bonded directly to the surface of the respective sensor or held in place in an alternative manner.

Figure 27:
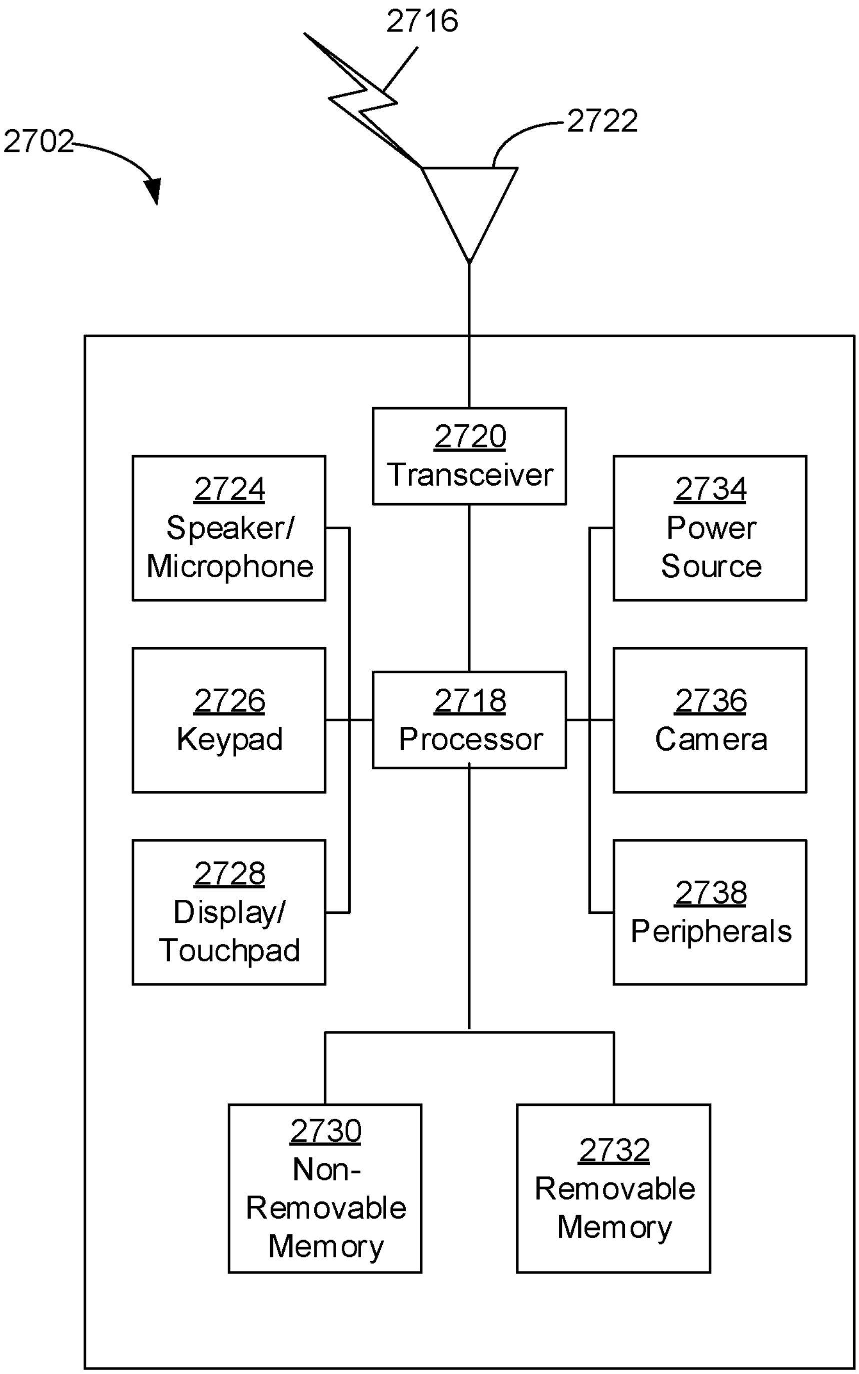
FIG. 27 is a system diagram illustrating an example wireless transmit/receive unit (WTRU) that may be used for capturing and/or processing plenoptic images according to an embodiment.

FIG. 27 is a functional block diagram illustrating an example wireless transmit-receive unit (WTRU) 2702 which may be used to capture and/or process plenoptic images as described herein. As shown in FIG. 27, the WTRU 2702 may include a processor 2718, a transceiver 2720, a transmit/receive element 2722, a speaker/microphone 2724, a keypad 2726, a display/touchpad 2728, non-removable memory 2730, removable memory 2732, a power source 2734, a camera 2736, and/or other peripherals 2738, among others. It will be appreciated that the WTRU 2702 may include any sub-combination of the foregoing elements while remaining consistent with an embodiment.

The processor 2718 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 2718 may perform signal coding, data processing, power control, input/output processing, and/or any other functionality that enables the WTRU 2702 to operate in a wireless environment. The processor 2718 may be coupled to the transceiver 2720, which may be coupled to the transmit/receive element 2722. While FIG. 27 depicts the processor 2718 and the transceiver 2720 as separate components, it will be appreciated that the processor 2718 and the transceiver 2720 may be integrated together in an electronic package or chip.

The transmit/receive element 2722 may be configured to transmit signals to, or receive signals from, a base station over the air interface 2716. For example, in one embodiment, the transmit/receive element 2722 may be an antenna configured to transmit and/or receive RF signals. In an embodiment, the transmit/receive element 2722 may be an emitter/detector configured to transmit and/or receive IR, UV, or visible light signals, for example. In yet another embodiment, the transmit/receive element 2722 may be configured to transmit and/or receive both RF and light signals. It will be appreciated that the transmit/receive element 2722 may be configured to transmit and/or receive any combination of wireless signals.

The transceiver 2720 may be configured to modulate the signals that are to be transmitted by the transmit/receive element 2722 and to demodulate the signals that are received by the transmit/receive element 2722. The WTRU 2702 may have multi-mode capabilities. Thus, the transceiver 2720 may include multiple transceivers for enabling the WTRU 102 to communicate via multiple radio access technologies, such as New Radio and IEEE 802.11, for example.

The processor 2718 of the WTRU 2702 may be coupled to, and may receive user input data from, the speaker/microphone 2724, the keypad 2726, the display/touchpad 2728 (e.g., a liquid crystal display (LCD) display unit or organic light-emitting diode (OLED) display unit), and/or the camera 2736. The processor 2718 may also output user data to the speaker/microphone 2724, the keypad 2726, and/or the display/touchpad 2728. In addition, the processor 2718 may access information from, and store data in, any type of suitable memory, such as the non-removable memory 2730 and/or the removable memory 2732. The non-removable memory 2730 may include random-access memory (RAM), read-only memory (ROM), a hard disk, or any other type of memory storage device. The removable memory 2732 may include a subscriber identity module (SIM) card, a memory stick, a secure digital (SD) memory card, and the like. In other embodiments, the processor 2718 may access information from, and store data in, memory that is not physically located on the WTRU 2702, such as on a server or a home computer (not shown).

The processor 2718 may receive power from the power source 2734, and may be configured to distribute and/or control the power to the other components in the WTRU 2702. The power source 2734 may be any suitable device for powering the WTRU 2702. For example, the power source 2734 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 2718 may also be coupled to the GPS chipset, which may be configured to provide location information (e.g., longitude and latitude) regarding the current location of the WTRU 2702. In addition to, or in lieu of, the information from the GPS chipset, the WTRU 2702 may receive location information over the air interface 2716 from a base station and/or determine its location based on the timing of the signals being received from two or more nearby base stations. It will be appreciated that the WTRU 2702 may acquire location information by way of any suitable location-determination method while remaining consistent with an embodiment.

The processor 2718 may further be coupled to other peripherals 2738, which may include one or more software and/or hardware modules that provide additional features, functionality and/or wired or wireless connectivity. For example, the peripherals 2738 may include an accelerometer, an e-compass, a satellite transceiver, additional digital camera (for photographs and/or video), a universal serial bus (USB) port, a vibration device, a television transceiver, a hands free headset, a Bluetooth© module, a frequency modulated (FM) radio unit, a digital music player, a media player, a video game player module, an Internet browser, a Virtual Reality and/or Augmented Reality (VR/AR) device, an activity tracker, and the like. The peripherals 2738 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

Although features and elements are described above in particular combinations, one of ordinary skill in the art will appreciate that each feature or element can be used alone or in any combination with the other features and elements.

What is claimed:

1. An apparatus comprising:

a color filter system comprising a repeated 6×6 pattern of filter pixels, each filter pixel being identifiable by integer coordinates (m,n), where 0≤m≤5 and 0≤n≤5, and each filter pixel having either a first, a second, or a third color;

wherein, in each of the following groups of nine filter pixels, three have the first color, three have the second color, and three have the third color:

(a) the filter pixels with both m=0, 1, or 2 and n=0, 1, or 2;

(b) the filter pixels with both m=3, 4, or 5 and n=0, 1, or 2;

(c) the filter pixels with both m=0, 1, or 2 and n=3, 4, or 5;

(d) the filter pixels with both m=3, 4, or 5 and n=3, 4, or 5;

(e) the filter pixels with both m=0, 2, or 4 and n=0, 2, or 4;

(f) the filter pixels with both m=1, 3, or 5 and n=0, 2, or 4;

(g) the filter pixels with both m=0, 2, or 4 and n=1, 3, or 5; and (h) the filter pixels with both m=1, 3, or 5 and n=1, 3, or 5.

2. The apparatus of claim 1, wherein:

each filter pixel (m,n), with m≤2 has a different color than filter pixel (m+3, n); and each filter pixel (m,n), with n≤2 has a different color than filter pixel (m, n+3).

3. The apparatus of claim 1, wherein the 6×6 pattern of filter pixels is arranged in the following pattern, or in a rotated or reflected version of the following pattern, where a "1" indicates the first color, a "2" indicates the second color, and a "3" indicates the third color:

| | | | | | |
|---|---|---|---|---|---|
| 2 | 2 | 1 | 3 | 3 | 2 |
| 3 | 1 | 1 | 2 | 2 | 3 |
| 2 | 3 | 3 | 1 | 1 | 1 |
| 3 | 3 | 2 | 1 | 1 | 3 |
| 1 | 2 | 2 | 3 | 3 | 1 |
| 3 | 1 | 1 | 2 | 2 | 2 |

4. The apparatus of claim 1, wherein the 6×6 pattern of filter pixels is arranged in the following pattern, or in a rotated or reflected version of the following pattern, where a "1" indicates the first color, a "2" indicates the second color, and a "3" indicates the third color:

| | | | | | |
|---|---|---|---|---|---|
| 1 | 1 | 2 | 2 | 2 | 3 |
| 1 | 3 | 2 | 2 | 1 | 3 |
| 2 | 3 | 3 | 3 | 1 | 1 |
| 2 | 2 | 3 | 3 | 3 | 1 |
| 3 | 2 | 1 | 1 | 3 | 2 |
| 3 | 1 | 1 | 1 | 2 | 2 |

5. The apparatus of claim 1, further comprising a light sensor array having a plurality of sensor pixels, wherein each of the filter pixels overlays a corresponding one of the sensor pixels.

6. The apparatus of claim 1, further comprising an array of micro-lenses, wherein each of the micro-lenses overlays a respective 3×3 quadrant within the 6×6 pattern of filter pixels.

7. The apparatus of claim 6, further comprising a main lens operative to focus light toward the array of micro-lenses.

8. The apparatus of claim 1, wherein the first color is red, the second color is green, and the third color is blue.

9. The apparatus of claim 1, wherein the 6×6 pattern of filter pixels is arranged in the following base pattern:

| | | | | | |
|---|---|---|---|---|---|
| 1 | 1 | 2 | 2 | 2 | 3 |
| 1 | 3 | 2 | 2 | 1 | 3 |
| 2 | 3 | 3 | 3 | 1 | 1 |
| 2 | 2 | 3 | 3 | 3 | 1 |
| 3 | 2 | 1 | 1 | 3 | 2 |
| 3 | 1 | 1 | 1 | 2 | 2 |

or in a pattern generated by performing one or more of the following transformations on the base pattern: swapping top and bottom halves, swapping left and right halves, mirroring, or rotating;

where a "1" indicates the first color, a "2" indicates the second color, and a "3" indicates the third color.

10. The apparatus of claim 1, wherein the 6×6 pattern of filter pixels is arranged in the following base pattern:

| | | | | | |
|---|---|---|---|---|---|
| 1 | 1 | 2 | 2 | 2 | 3 |
| 1 | 2 | 2 | 3 | 3 | 1 |
| 3 | 3 | 3 | 2 | 1 | 1 |
| 2 | 2 | 3 | 3 | 3 | 1 |
| 2 | 3 | 3 | 1 | 1 | 2 |
| 1 | 1 | 1 | 3 | 2 | 2 |

or in a pattern generated by performing one or more of the following transformations on the base pattern: swapping top and bottom halves, swapping left and right halves, mirroring, or rotating;

where a "1" indicates the first color, a "2" indicates the second color, and a "3" indicates the third color.

11. The apparatus of claim 1, wherein:

at least one filter pixel (m,n) with m≤2 has a different color than filter pixel (m+3, n); and at least one filter pixel (m,n) with n≤2 has a different color than filter pixel (m, n+3).

12. A method of jointly refocusing and demosaicing a plenoptic image generated using a nona-pixel sensor, the method comprising:

generating a refocused image by summing nine sub-aperture images obtained from the plenoptic image with an integer disparity value;

wherein each pixel of the refocused image is a normalized sum of three pixels of a first color, three pixels of a second color, and three pixels of a third color in the plenoptic image.

13. The method of claim 12, wherein each of the nine sub-aperture images has an extended Bayer pattern.

14. The method of claim 12, wherein the integer disparity value is zero.

15. The method of claim 12, wherein the integer disparity value is one.

16. The method of claim 12, wherein the integer disparity value is two.

17. The method of claim 12, wherein the pixels in the plenoptic image are associated with a repeated 6×6 color pattern, each position in the color pattern being identifiable by integer coordinates (m,n), where 0≤m≤5 and 0≤n≤5, and each position in the color pattern having either a first, a second, or a third color;

wherein, in each of the following groups of nine positions, three have the first color, three have the second color, and three have the third color:

(a) the positions with both m=0, 1, or 2 and n=0, 1, or 2;

(b) the positions with both m=3, 4, or 5 and n=0, 1, or 2;

(c) the positions with both m=0, 1, or 2 and n=3, 4, or 5;

(d) the positions with both m=3, 4, or 5 and n=3, 4, or 5;

(e) the positions with both m=0, 2, or 4 and n=0, 2, or 4;

(f) the positions with both m=1, 3, or 5 and n=0, 2, or 4;

(g) the positions with both m=0, 2, or 4 and n=1, 3, or 5; and (h) the positions with both m=1, 3, or 5 and n=1, 3, or 5.

18. The method of claim 17, wherein:

at least one position (m,n) with m≤2 has a different color than position (m+3, n); and at least one position (m,n) with n≤2 has a different color than filter pixel (m, n+3).

19. A non-transitory computer-readable medium storing a plenoptic image comprising a plurality of pixels, the pixels in the plenoptic image being associated with a repeated 6×6 color pattern, each position in the color pattern being identifiable by integer coordinates (m,n), where 0≤m≤5 and 0≤n≤5, and each position in the color pattern having either a first, a second, or a third color;

wherein, in each of the following groups of nine positions, three have the first color, three have the second color, and three have the third color:

(a) the positions with both m=0, 1, or 2 and n=0, 1, or 2;

(b) the positions with both m=3, 4, or 5 and n=0, 1, or 2;

(c) the positions with both m=0, 1, or 2 and n=3, 4, or 5;

(d) the positions with both m=3, 4, or 5 and n=3, 4, or 5;

(e) the positions with both m=0, 2, or 4 and n=0, 2, or 4;

(f) the positions with both m=1, 3, or 5 and n=0, 2, or 4;

(g) the positions with both m=0, 2, or 4 and n=1, 3, or 5; and (h) the positions with both m=1, 3, or 5 and n=1, 3, or 5;

wherein at least one position (m,n) with m≤2 has a different color than position (m+3, n), and at least one position (m,n) with n≤2 has a different color than filter pixel (m, n+3).

20. The non-transitory computer-readable medium of claim 19, wherein:

each position (m,n), with m≤2 has a different color than position (m+3, n); and each position (m,n), with n≤2 has a different color than position (m, n+3).

* * * * *